United States Patent
Min et al.

(10) Patent No.: US 8,199,304 B2
(45) Date of Patent: Jun. 12, 2012

(54) HORIZONTAL ELECTRIC FIELD TYPE LIQUID CRYSTAL DISPLAY AND MANUFACTURING METHOD THEREOF

(75) Inventors: Tae Yup Min, Beijing (CN); Yang Pei, Beijing (CN); Jing Wang, Beijing (CN); Wenbao Gao, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 155 days.

(21) Appl. No.: 12/722,745

(22) Filed: Mar. 12, 2010

(65) Prior Publication Data

US 2010/0231818 A1    Sep. 16, 2010

(30) Foreign Application Priority Data

Mar. 13, 2009 (CN) .......................... 2009 1 0079953

(51) Int. Cl.
*G02F 1/1343* (2006.01)
(52) U.S. Cl. ........................................ 349/142; 349/141
(58) Field of Classification Search ........... 349/141–142
See application file for complete search history.

(56) References Cited

U.S. PATENT DOCUMENTS

2008/0129901 A1    6/2008 You et al.

FOREIGN PATENT DOCUMENTS

| CN | 101196664 A | 6/2008 |
|---|---|---|
| KR | 2002-0029841 A | 4/2002 |
| KR | 2008-0050851 A | 6/2008 |
| KR | 20080057433 A | 6/2008 |

*Primary Examiner* — Phu Vu
(74) *Attorney, Agent, or Firm* — Ladas & Parry LLP

(57) ABSTRACT

The embodiments of the present invention relate to a horizontal electric field type LCD and a manufacturing method thereof. The horizontal electric field type LCD comprises a first substrate, a second substrate, a liquid crystal layer sandwiched between the first substrate and the second substrate, and a spacer disposed between the first and the second substrates. Said first substrate comprises a thin film transistor, and a gate line and a data line for driving the thin film transistor. Said second substrate comprises a pixel electrode and a common electrode corresponding to and forming a horizontal electric field with the pixel electrode. Said spacer is a conductive spacer electrically connecting each pixel electrode on the second substrate to the corresponding thin film transistor on the first substrate.

20 Claims, 17 Drawing Sheets

HORIZONTAL ELECTRIC FIELD TYPE LIQUID CRYSTAL DISPLAY AND MANUFACTURING METHOD THEREOF

BACKGROUND

The present invention relates to a horizontal electric field type liquid crystal display (LCD) and a manufacturing method thereof.

Liquid crystal displays (LCDs) belong to a primary type of flat panel display (FPD).

According to the orientation of the electric field for driving liquid crystal, a LCD can be classified as a vertical electric field type LCD and a horizontal electric field type LCD. The vertical electric field type LCD comprises a Twist Nematic (TN) type LCD; the horizontal electric field type LCD comprises a Fringe Field Switching (FFS) type LCD and an In-Plane Switching (IPS) type LCD.

In an LCD, generally, storage capacitance can be formed between the pixel electrode and the common electrode, and parasitic capacitance can be formed between the pixel electrode and the data line. The storage capacitance is used for aligning liquid crystal so as to display image; the parasitic capacitance is a kind of interference capacitance, disturbing the normal alignment of liquid crystal. Therefore, during the manufacturing of a LCD, the pixel electrode and the gate line may be spaced from each other in order to prevent the undesirable phenomenon caused by the parasitic capacitance. But, this causes the increase of the shielded area by black matrix and the decrease of aperture ratio of the LCD. Aperture ratio is one of the main indexes for evaluating LCD; and in general, the higher the aperture ratio, the better the LCD.

One existing technique for improving aperture ratio comprises: coating a thick organic insulating layer between the pixel electrode and the data line, thus reducing the interference of the parasitic capacitance by increasing the straight line distance between the pixel electrode and the data line. That is, the method includes forming the organic insulating film on the substrate after forming the data line, and then forming the pixel electrode on the organic insulating film. The aperture ratio can be increased by about 30% through this method of inserting an organic insulating film.

Another existing technique for improving aperture ratio comprises a method of forming color resins on an array substrate.

Wide viewing angle is another one of the main indexes for evaluating a LCD. The horizontal electric field LCD is one of the widely used techniques for realizing wide viewing angle.

FIG. 1 is a sectional schematic view of an existing horizontal electric field LCD. As shown in FIG. 1, the LCD comprises a first substrate 11 and a second substrate 21. A common electrode 13 is provided on the first substrate 11, a gate electrode 12 is provided at a side of the common electrode 13, a gate insulating layer 14 covers the gate electrode 12 and the common electrode 13, a semiconductor layer 15 is provided over the gate electrode 12, a drain electrode (data line) 16 is provided on the semiconductor layer 15, a passivation layer 17 covers the whole substrate, and a pixel electrode 18 is formed on the passivation layer 17 and electrically connected to the data line via a through hole in the passivation layer 17.

Here, the horizontal electric field LCD forms the horizontal electric field by forming a pixel electrode and a common electrode on the first substrate, and controls alignment of liquid crystal within the horizontal plane by forming a horizontal electric field, thus to realize better performance of wide viewing angle.

Since the structure of the horizontal electric field LCD is different from that of a vertical electric field LCD, the above two techniques for improving aperture ratio can not be utilized.

In particular, if the first technique for improving aperture ratio is used in a horizontal electric field LCD, the straight line distance between the pixel electrode and the common electrode becomes greater and so the horizontal electric field can not be formed effectively. If the second technique for improving aperture ratio is used in a horizontal electric field LCD, the color resins are located within the horizontal electric field area while the liquid crystal are out of the horizontal electric field. Therefore, even if the horizontal electric field is formed, the electric field can not be used to effectively align the liquid crystal.

SUMMARY

An embodiment of the present invention provides a horizontal electric field LCD, comprising a first substrate, a second substrate, a liquid crystal layer sandwiched between the first substrate and the second substrate, and a spacer disposed between the first and the second substrates. The first substrate comprises a thin film transistor, and a gate line and a data line for driving the thin film transistor. The second substrate comprises a pixel electrode and a common electrode corresponding to and forming a horizontal electric field with the pixel electrode. The spacer is a conductive spacer electrically connecting each pixel electrode on the second substrate to the corresponding thin film transistor on the first substrate.

Another embodiment of the present invention also provides a method of manufacturing a horizontal electric field type LCD comprising the following steps. Step 1: providing a first substrate with a thin film transistor and a gate line and a data line for driving the thin film transistor; Step 2: providing a second substrate with a pixel electrode and a common electrode corresponding to and forming a horizontal electric field with the pixel electrode; Step 3: forming a conductive spacer for electrically connecting each pixel electrode on the second substrate to the corresponding thin film transistor on the first substrate; and Step 4: assembling the first substrate and the second substrate together, providing a liquid crystal layer between the first substrate and the second substrate, and electrically connecting the thin film transistor to the pixel electrode via the conductive spacer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

1. First Embodiment of a LCD of the Present Invention

Figure 1:
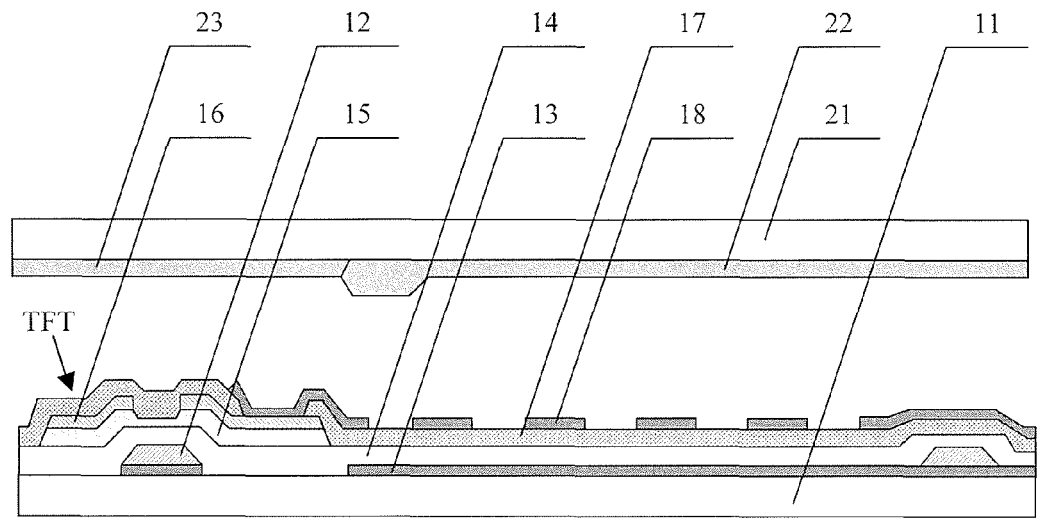
FIG. 1 is a sectional schematic view of an existing horizontal electric field LCD.
Figure 2:
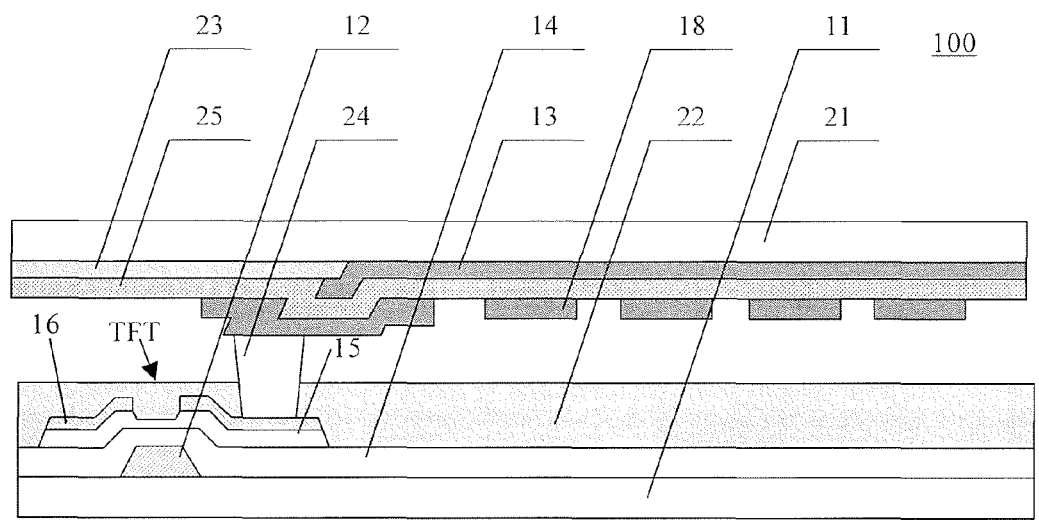
FIG. 2 is a schematic view showing the first embodiment of the LCD of the present invention.

FIG. 2 is a schematic view showing the first embodiment of the LCD of the present invention. As shown in FIG. 2, the LCD 100 of the present embodiment is a horizontal electric field type LCD comprising: a first substrate 11, a second substrate 21 and a liquid crystal layer (not shown) sandwiched between the first substrate 11 and the second substrate 21.

The first substrate 11 comprises at least one thin film transistor and at least one gate line and at least one data line 16 for driving the at least one thin film transistor. The second substrate 21 comprises at least one pixel electrode 18 and a common electrode 13 corresponding to the pixel electrode 18 for forming a horizontal electric field. The LCD also comprises at least one conductive spacer 24 for electrically connecting each pixel electrode on the second substrate 21 to the corresponding thin film transistor on the first substrate 11.

In addition, on the first substrate 11, a gate electrode 12 is connected to or integrally formed with the corresponding gate line; a gate insulating layer 14 covers the gate electrode 12; a semiconductor layer 15 is provided over the gate electrode 12; and on the both ends of the semiconductor layer 15 are provided with a drain electrode 19 and a source electrode that is connected to or integrally formed with the data line 16, respectively. As shown in FIG. 2, the source electrode is integrally formed with the data line 16.

The LCD 100 of the present embodiment increases the distance between the data line 16 and the pixel electrode 18 by disposing a thin film transistor array on the first substrate 11, forming the common electrode 13 and the pixel electrode 18 on the second substrate 21, and electrically connecting the thin film transistor on the first substrate 11 to the pixel electrode 18 on the second substrate 21 through the conductive spacer 24, thus effectively increasing the straight line distance between the data line 16 and the pixel electrode 18. In this way, the horizontal distance between the data line 16 and the pixel electrode 18 is reduced, which is helpful to increase the area of the pixel electrode 18 and thus to improve the aperture ratio. In addition, the LCD 100 of the present embodiment does not affect the horizontal electric field formed between the common electrode 13 and the pixel electrode 18, thereby overcoming the defect of the prior art that the technique for improving aperture ratio can not be applied to the horizontal electric field type LCD 100. Furthermore, the LCD 100 of the present embodiment improves the brightness by increasing the aperture ratio, whereby the optical thin film for improving brightness can be properly reduced and so the manufacturing cost of the LCD can be lowered.

In the present embodiment, one end of each conductive spacer 24 is disposed on the corresponding pixel electrode 18 on the second substrate 21, and the other end is disposed on the corresponding thin film transistor on the first substrate 11, such that the pixel electrode 18 and the thin film transistor are electrically connected.

The LCD 100 of the present embodiment may further comprise a color resin 22 positioned on the first substrate 11 or on the second substrate 21.

The LCD 100 of the present embodiment may further comprise a black matrix 23 positioned on the first substrate 11 or on the second substrate 21.

In the present embodiment, if the pixel electrode 18 is provided with a plurality of slits while the common electrode 13 is a plate-like electrode without a slit, the horizontal electric field type LCD 100 is a Fringe Field Switching (FFS) type LCD; and if the common electrode 13 is also provided with at least one slit, the horizontal electric field type LCD 100 is an In-Plane Switching (IPS) type LCD.

2. Second Embodiment of the LCD of the Present Invention

Figure 3:
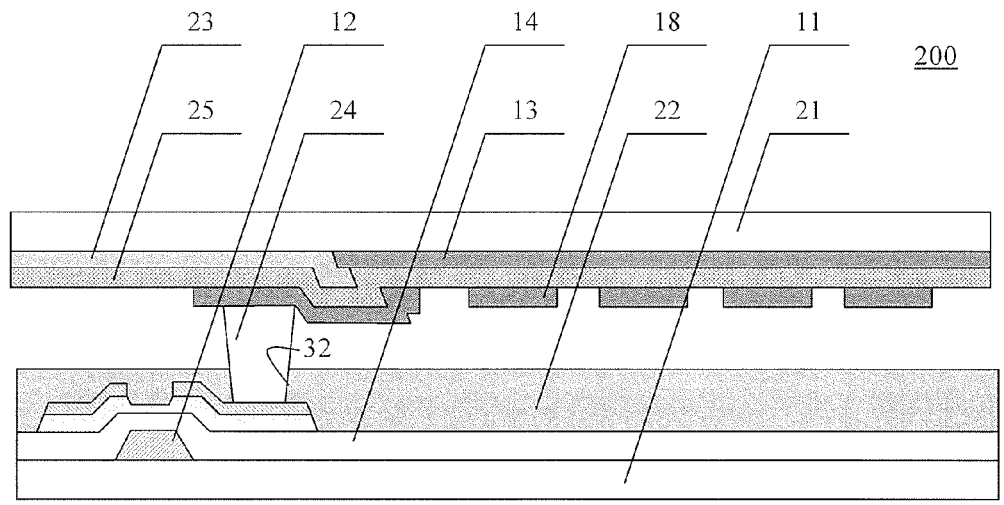
FIG. 3 is a schematic view showing the second embodiment of the LCD of the present invention.

FIG. 3 is a schematic view showing the second embodiment of the LCD of the present invention. As shown in FIG. 3, the LCD 200 of the present embodiment is a horizontal electric field type LCD comprising: a first substrate 11, a second substrate 21 and a liquid crystal layer (not shown) sandwiched between the first substrate and the second substrate.

The first substrate 11 comprises a thin film transistor, a color resin 22 on the thin film transistor, and a color resin through-hole 32 over a drain electrode 19 of the thin film transistor. The second substrate 21 comprises a common electrode 13 thereon, and the edge portion of a black matrix 23 overlaps the edge portion of the common electrode 13, where the black matrix 23 is on the common electrode 13. A first insulating layer 25 is on the common electrode 13, and a pixel electrode 18 is on the first insulating layer 25 and has at least one slit. A conductive spacer 24 is on the pixel electrode 18, for electrically connecting the pixel electrode 18 and the drain electrode 19 of the thin film transistor. The thin film transistor in this embodiment may be identical to that in the first embodiment.

The LCD 200 of the present embodiment increases the distance between the data line 16 and the pixel electrode 18 by disposing thin film transistor array on the first substrate 11, forming the common electrode 13 and the pixel electrode 18 on the second substrate 21, and electrically connecting the thin film transistor on the first substrate 11 to the pixel electrode 18 on the second substrate 21 through the conductive spacer 24, thus effectively increasing the straight line distance between the data line 16 and the pixel electrode 18. In this way, the horizontal distance between the data line 16 and the pixel electrode 18 is reduced, which is helpful to increase the area of the pixel electrode 18 and to improve the aperture ratio. In addition, the LCD 200 of the present embodiment does not affect the horizontal electric field formed between the common electrode 13 and the pixel electrode 18, thereby overcoming the defect of the prior art that the technique for improving aperture ratio can not be applied to the horizontal electric field type LCD. Furthermore, the LCD 200 of the present embodiment improves the brightness of the LCD by increasing the aperture ratio, whereby the optical thin film for improving brightness can be properly reduced and so the manufacturing cost of the LCD can be lowered.

In the present embodiment, the common electrode 13 may be provided with at least one slit such that said horizontal electric field type LCD is an In-Plane Switching (IPS) type LCD.

In the present embodiment, a passivation layer (not shown) may further be deposited on the thin film transistor, and a passivation layer through-hole may be disposed in the passivation layer at a position corresponding to the color resin through-hole.

3. Third Embodiment of the LCD of the Present Invention

Figure 4:
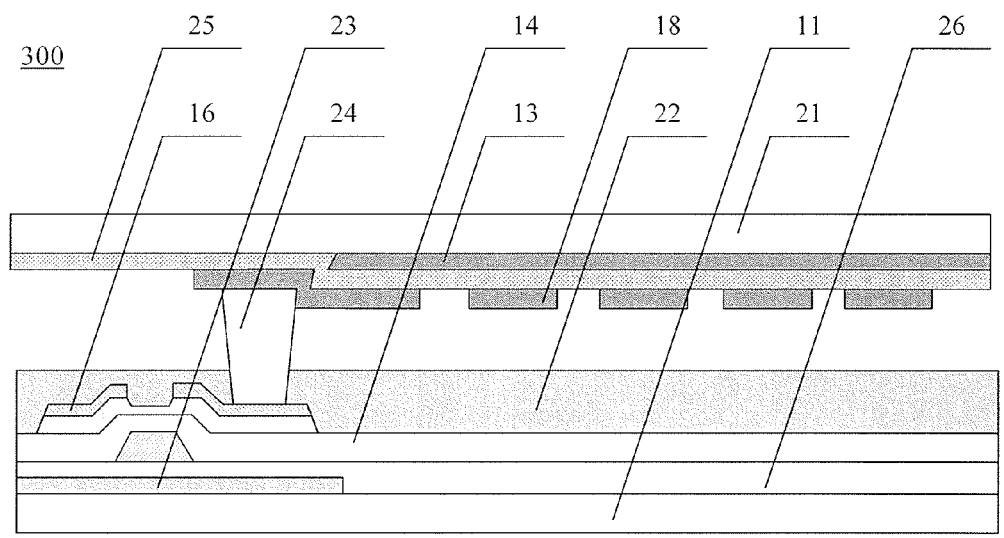
FIG. 4 is a schematic view showing the third embodiment of the LCD of the present invention.

FIG. 4 is a schematic view showing the third embodiment of the LCD of the present invention. As shown in FIG. 3, the LCD 300 of the present embodiment is a horizontal electric field type LCD comprising: a first substrate 11, a second substrate 21 and a liquid crystal layer (not shown) sandwiched between the first substrate 11 and the second substrate 21.

The first substrate 11 comprises a black matrix 23, a second insulating layer 26 on the black matrix 23, a thin film transistor on the second insulating layer 26, a color resin 22 on the thin film transistor, and a color resin through-hole 32 over a drain electrode 19 of the thin film transistor. The second substrate 21 comprises a common electrode 13, a first insulating layer 25 on the common electrode 13, and a pixel electrode 18 having at least one slit and on the first insulating layer 25. A conductive spacer 24 is on the pixel electrode 18, for electrically connecting the pixel electrode 18 and the drain electrode 19 of the thin film transistor. The thin film transistor in this embodiment may be identical to that in the first embodiment.

In the LCD 300 of the present embodiment, the black matrix 23 and the thin film transistor array are sequentially disposed on the first substrate 11; the common electrode 13 and the pixel electrode 18 are formed on the second substrate 21; and the conductive spacer 24 electrically connects the thin film transistor on the first substrate 11 to the pixel electrode 18 on the second substrate 21. Therefore, in the case that the black matrix 23, the color resin 22 and the thin film transistor array are all formed on the first substrate 11, liquid crystal is not out of the horizontal electric field, thereby overcoming the defect of the prior art that the technique for improving aperture ratio can not be applied to the horizontal electric field type LCD. Furthermore, the LCD 300 of the present embodiment improves the brightness of the LCD by increasing the aperture ratio, whereby the optical thin film for improving brightness can be properly reduced and so the manufacturing cost of the LCD can be lowered.

In the present embodiment, the common electrode 13 may be provided with at least one slit such that said horizontal electric field type LCD is an In-Plane Switching (IPS) type LCD.

In the present embodiment, a passivation layer (not shown) may further be deposited on the thin film transistor.

4. Fourth Embodiment of the LCD of the Present Invention

Figure 5:
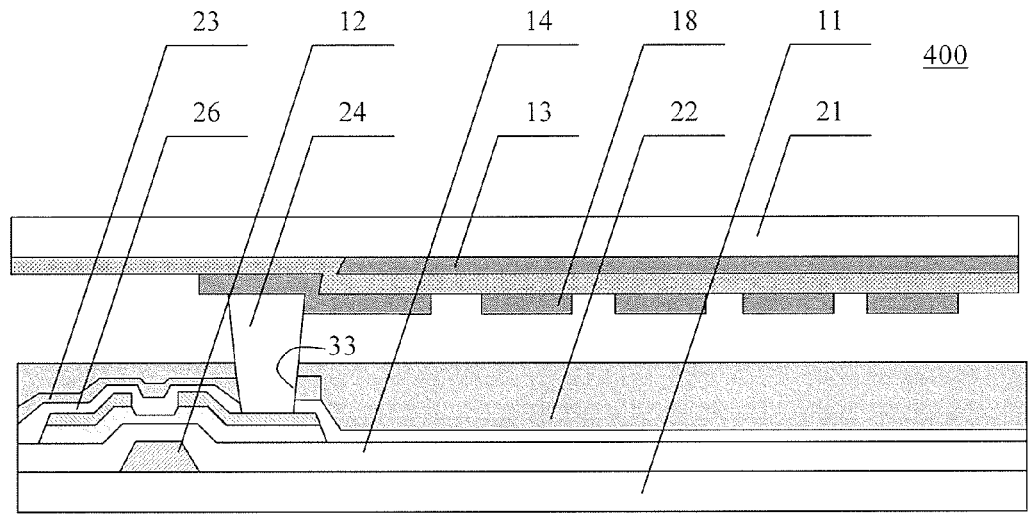
FIG. 5 is a schematic view showing the fourth embodiment of the LCD of the present invention.

FIG. 5 is a schematic view showing the fourth embodiment of the LCD of the present invention. As shown in FIG. 3, the LCD 300 of the present embodiment is a horizontal electric field type LCD comprising: a first substrate 11, a second substrate 21 and a liquid crystal layer (not shown) sandwiched between the first substrate and the second substrate.

The first substrate 11 comprises a thin film transistor, a black matrix 23 on the thin film transistor, a color resin 22 on the black matrix, and a color resin through-hole 32 and a black matrix through-hole 33 over a drain electrode 19 of the thin film transistor. The second substrate 21 comprises a common electrode 13, a first insulating layer 25 on the common electrode 13, and a pixel electrode 18 having at least one slit and on the first insulating layer 25. A conductive spacer 24 is provided on the pixel electrode 18, for electrically connecting the pixel electrode 18 and the drain electrode 19 of the thin film transistor. The thin film transistor in this embodiment may be identical to that in the first embodiment.

In the LCD 400 of the present embodiment, the thin film transistor array and the black matrix 23 are sequentially disposed on the first substrate 11; the common electrode 13 and the pixel electrode 18 are formed on the second substrate 21; and the conductive spacer 24 electrically connects the thin film transistor on the first substrate 11 to the pixel electrode 18 on the second substrate 21. Therefore, in the case that the black matrix 23, the color resin 22 and the thin film transistor array are formed on the first substrate 11, liquid crystal is out of the horizontal electric field, thereby overcoming the defect of the prior art that the technique for improving aperture ratio can not be applied to the horizontal electric field type LCD. Furthermore, the LCD 400 of the present embodiment improves the brightness of the LCD by increasing the aperture ratio, whereby the optical thin film for improving brightness can be properly reduced and so the manufacturing cost of the LCD can be lowered.

In the present embodiment, the common electrode may be provided with at least one slit such that said horizontal electric field type LCD is an In-Plane Switching (IPS) type LCD.

In the present embodiment, a passivation layer (not shown) may further be deposited on the thin film transistor, and a passivation layer through-hole may be disposed in the passivation layer at a position corresponding to the color resin through-hole. In this case, the black matrix through-hole 33, the passivation layer through-hole and the color resin through-hole 32 have the same orientation and are in communication with each other.

Figure 6:
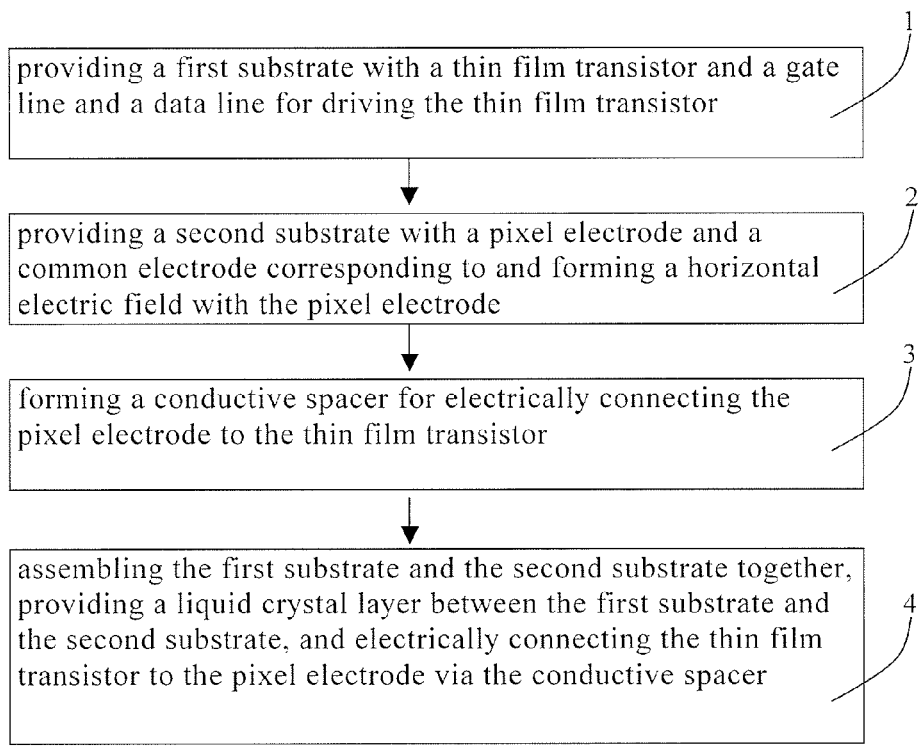
FIG. 6 is a flow chart showing the first embodiment of the manufacturing method of a LCD of the present invention.

5. First Embodiment of the Manufacturing Method of a LCD of the Present Invention FIG. 6 is a flow chart showing the first embodiment of the manufacturing method of a LCD of the present invention. As shown in FIG. 6, the manufacturing method of a LCD of the present embodiment comprises the following steps.

Step 1: providing a first substrate with a thin film transistor and a gate line and a data line for driving the thin film transistor.

Step 2: providing a second substrate with a pixel electrode and a common electrode corresponding to and forming a horizontal electric field with the pixel electrode.

Step 3: forming a conductive spacer for electrically connecting the pixel electrode to the thin film transistor.

Step 4: assembling the first substrate and the second substrate together, providing a liquid crystal layer between the first substrate and the second substrate, and electrically connecting the thin film transistor to the pixel electrode via the conductive spacer.

The manufacturing method of a LCD of the present embodiment increases the distance between the data line and the pixel electrode by forming thin film transistor array on the first substrate, forming the common electrode and the pixel electrode on the second substrate, and electrically connecting the thin film transistor on the first substrate to the pixel electrode on the second substrate through the conductive spacer, thus effectively increasing the straight line distance between the data line and the pixel electrode. In this way, the horizontal distance between the data line and the pixel electrode is reduced, which is helpful to increase the area of the pixel electrode and to improve the aperture ratio. In addition, the LCD of the present embodiment does not affect the horizontal electric field formed between the common electrode and the pixel electrode, thereby overcoming the defect of the prior art that the technique for improving aperture ratio can not be applied to the horizontal electric field type LCD. Furthermore, the LCD of the present embodiment improves the brightness of the LCD by increasing the aperture ratio, whereby the optical thin film for improving brightness can be properly reduced and so the manufacturing cost of the LCD can be lowered.

In the present embodiment, one end of the conductive spacer may be formed on the thin film transistor of the first substrate and the other end is projected in the Step 3; and in the Step 4, the other end of the conductive spacer is brought into contact with the pixel electrode of the second substrate. That is, the conductive spacer may be formed on the first substrate, and then the other end of the conductive spacer is brought into contact with the pixel electrode on the second substrate during the assembling process.

Alternatively, in the present embodiment, one end of the conductive spacer may be formed on the pixel electrode of the second substrate and the other end is projected in the Step 3; and in the Step 4, the other end of the conductive spacer is brought into contact with the thin film transistor of the first substrate. That is, the conductive spacer may be formed on the second substrate, and then the other end of the conductive spacer is brought into contact with the thin film transistor on the first substrate during the assembling process.

In the present embodiment, a plurality of slits capable of forming the horizontal electric field with the common electrode is formed on the pixel electrode. If the pixel electrode is provided with a plurality of slits while the common electrode does not have any slit, the horizontal electric field type LCD is a Fringe Field Switching type LCD; and if the common electrode is also provided with at least one slit, the horizontal electric field type LCD is an In-Plane Switching type LCD.

In the present embodiment, the Step 1 may further comprise: forming a color resin on the first substrate. Or, the Step 2 may further comprise: forming a color resin on the second substrate. If no color resin is formed on the two substrates, a light source with three primary colors, e.g., light emitting diode and etc., may be adopted in the backlight module.

In the present embodiment, the Step 1 may further comprise: forming a black matrix on the first substrate. Or, the Step 2 may further comprise: forming a black matrix on the second substrate. If no black matrix is formed, although the brightness of the LCD may be maximized, the optical unde-

Figure 7A:
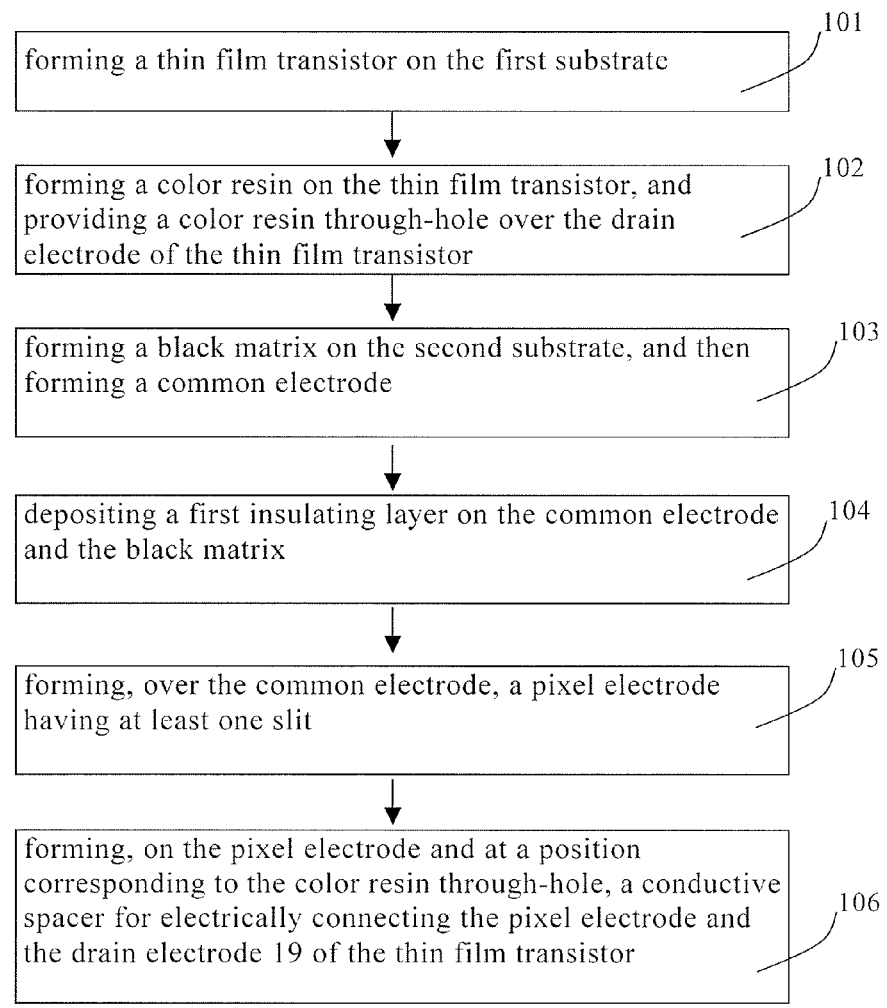
FIG. 7a is a flow chart showing the second embodiment of the manufacturing method of a LCD of the present invention.
Figure 7B:
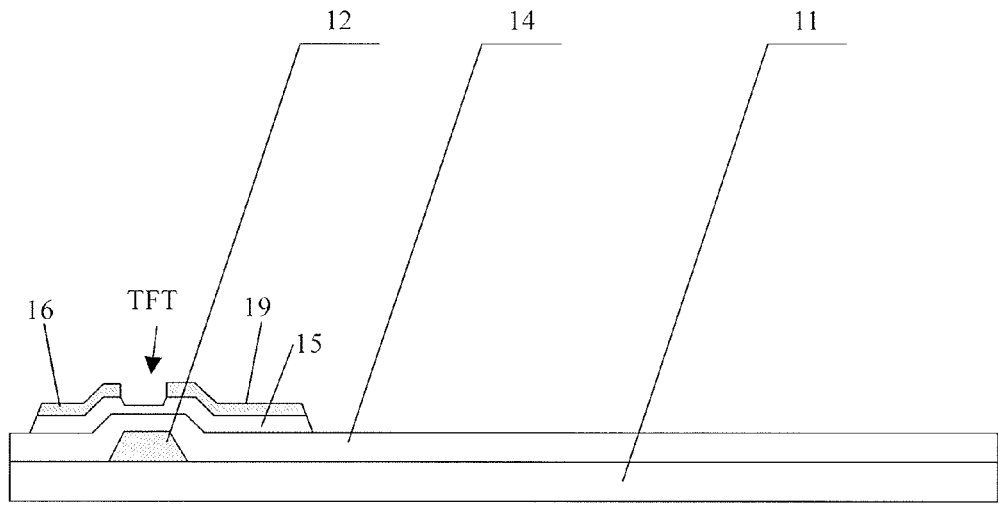
FIG. 7b is a schematic view showing the formation of a thin film transistor in the second embodiment of the manufacturing method of a LCD of the present invention.
Figure 7C:
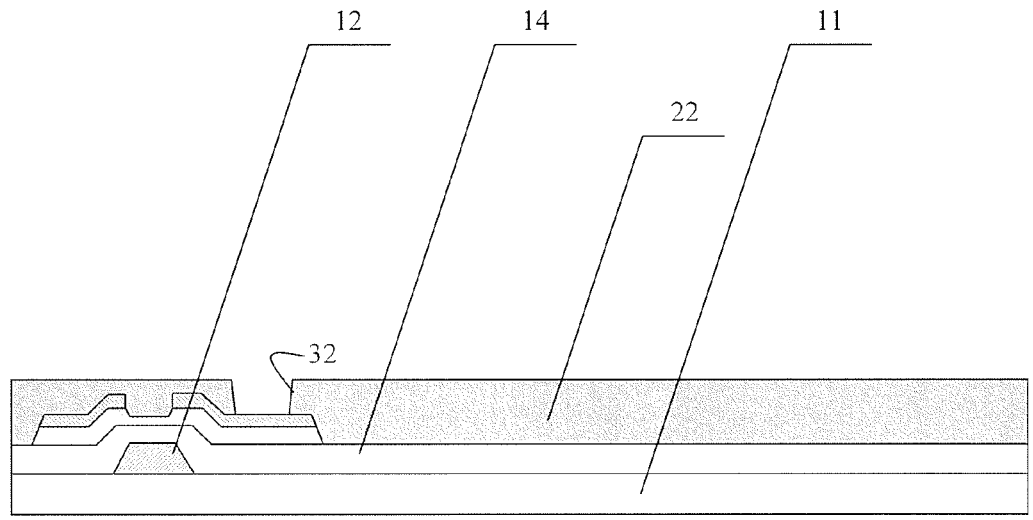
FIG. 7c is a schematic view showing the formation of a color resin in the second embodiment of the manufacturing method of a LCD of the present invention.
Figure 7D:
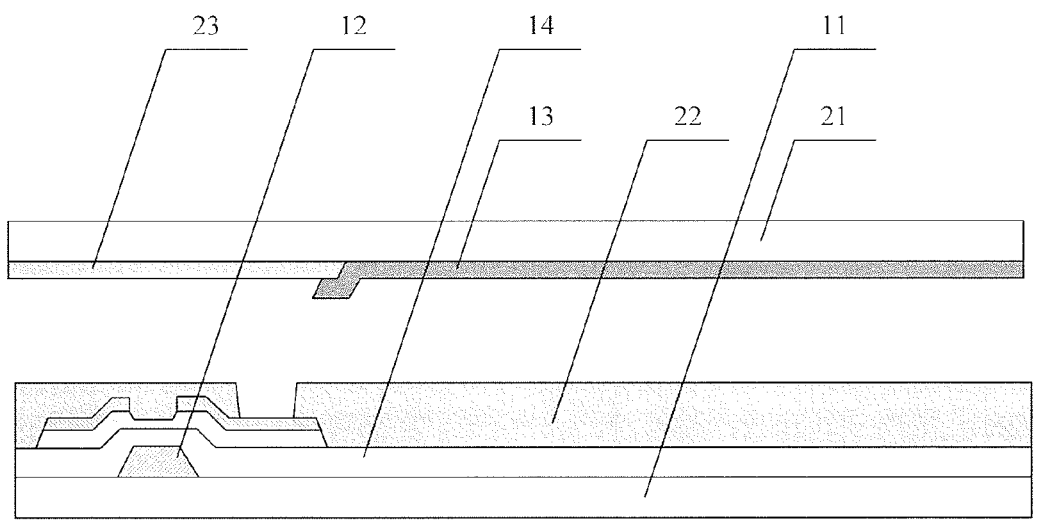
FIG. 7d is a schematic view showing the formation of a black matrix and a common electrode in the second embodiment of the manufacturing method of a LCD of the present invention.
Figure 7E:
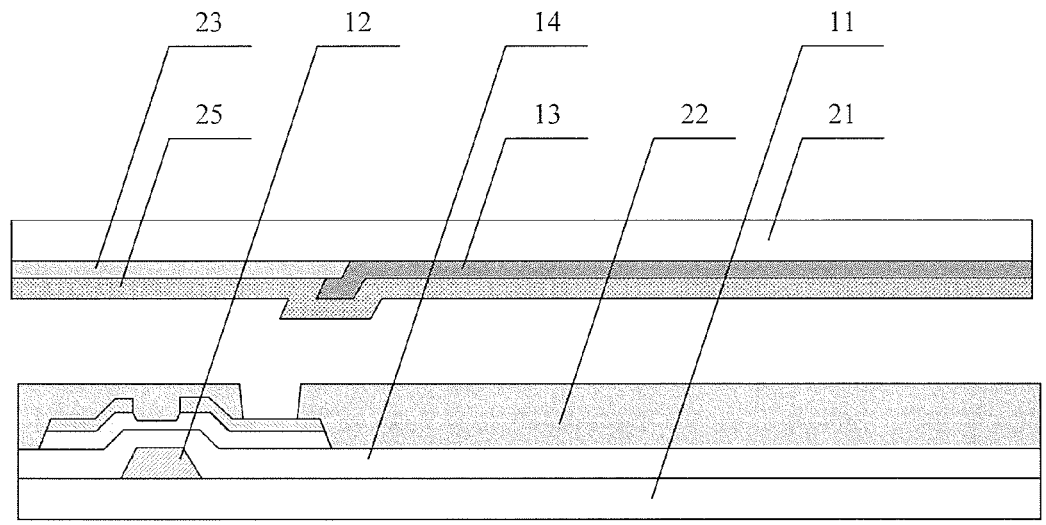
FIG. 7e is a schematic view showing the deposition of a first insulating layer in the second embodiment of the manufacturing method of a LCD of the present invention.
Figure 7F:
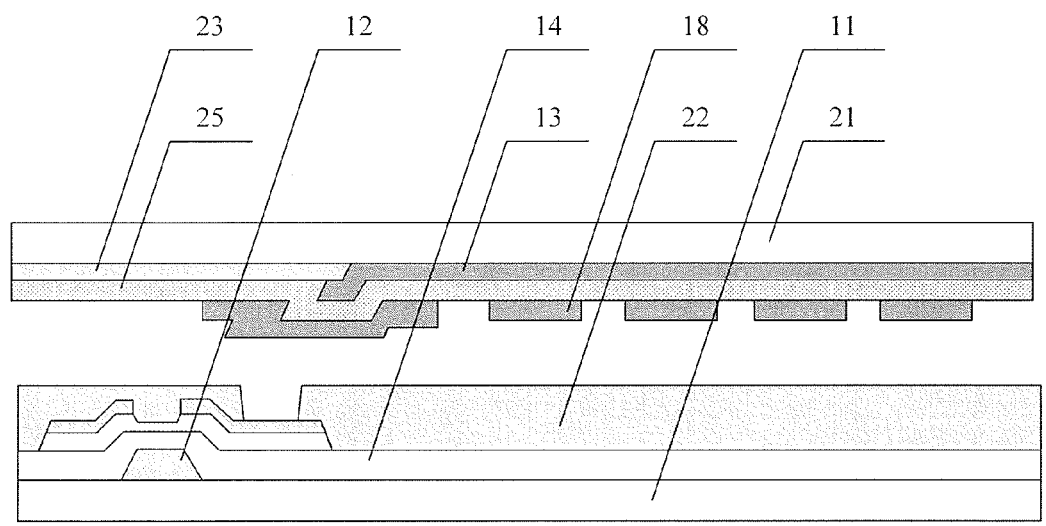
FIG. 7f is a schematic view showing the formation of a pixel electrode in the second embodiment of the manufacturing method of a LCD of the present invention.
Figure 7G:
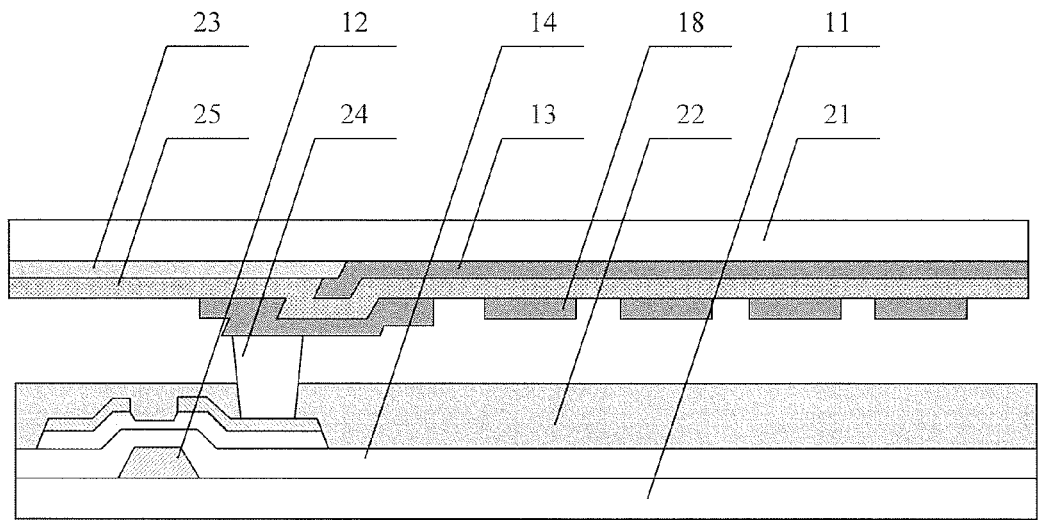
FIG. 7g is a schematic view showing the formation of a conductive spacer in the second embodiment of the manufacturing method of a LCD of the present invention.

6. Second Embodiment of the Manufacturing Method of a LCD of the Present Invention FIG. 7a is a flow chart showing the second embodiment of the manufacturing method of a LCD of the present invention; FIG. 7b is a schematic view showing the formation of a thin film transistor in the second embodiment of the manufacturing method of a LCD of the present invention; FIG. 7c is a schematic view showing the formation of a color resin in the second embodiment of the manufacturing method of a LCD of the present invention; FIG. 7d is a schematic view showing the formation of a black matrix and a common electrode in the second embodiment of the manufacturing method of a LCD of the present invention; FIG. 7e is a schematic view showing the deposition of a first insulating layer in the second embodiment of the manufacturing method of a LCD of the present invention; FIG. 7f is a schematic view showing the formation of a pixel electrode in the second embodiment of the manufacturing, method of a LCD of the present invention; FIG. 7g is a schematic view showing the formation of a conductive spacer in the second embodiment of the manufacturing method of a LCD of the present invention.

As shown in FIGS. 7a~7g, the manufacturing method of a LCD of the present embodiment comprises the following steps.

Step 101: forming a thin film transistor on the first substrate 11. The method of forming the thin film transistor may use known or future developed technologies, and so detailed description is omitted here. The thin film transistor comprises a gate electrode 12, a gate insulating layer 14, a semiconductor layer 15, a drain electrode 19, and a source electrode connected to or integrally formed with the data line 16, and the gate electrode 12 can be connected to or integrally formed with the corresponding gate line, as shown in FIG. 7b.

Step 102: forming a color resin 22 on the thin film transistor, and providing a color resin through-hole 32 over the drain electrode 19 of the thin film transistor, as shown in FIG. 7c.

Step 103: firstly forming a black matrix 23 on the second substrate 21, and then forming a common electrode 13. The edge of the black matrix 23 and the edge of the common electrode 13 overlap each other, and the edge of the common electrode 13 is on the edge of the black matrix 23, as shown in FIG. 7d. In case of pixels, a common electrode is between two black matrixes.

Step 104: depositing a first insulating layer 25 on the common electrode 13 and the black matrix 23 such that the first insulating layer 25 covers the whole surface of the substrate 21, as shown in FIG. 7e.

Step 105: forming, over the common electrode 13, a pixel electrode 18 having at least one slit, as shown in FIG. 7f.

Step 106: forming, on the pixel electrode 18 and at a position corresponding to the color resin through-hole 32, a conductive spacer 24 for electrically connecting the pixel electrode 18 and the drain electrode 19 of the thin film transistor, as shown in FIG. 7g.

Then, the prepared first substrate 11 and second substrate 21 are assembled together, and a liquid crystal layer (not shown) is provided in a liquid crystal cell formed by the first substrate 11 and the second substrate 21. After the assembling, the conductive spacer 24 electrically connects the pixel electrode 18 and the corresponding drain electrode 19 of the thin film transistor.

In this embodiment, Step 101 and Step 102 belong to the manufacturing process of the first substrate; Step 103 to Step 106 belong to the manufacturing process of the second substrate.

In the manufacturing method of a LCD of the present embodiment, the thin film transistor array is formed on the first substrate, the common electrode and the pixel electrode are formed on the second substrate, and the conductive spacer electrically connects the thin film transistor on the first substrate to the pixel electrode on the second substrate. Thus, the distance between the data line and the pixel electrode is increased, thus effectively increasing the straight line distance between the data line and the pixel electrode. In addition, the horizontal electric field formed between the common electrode and the pixel electrode is not affected, thereby overcoming the defect of the prior art that the technique for improving aperture ratio can not be applied to the horizontal electric field type LCD. Furthermore, the LCD of the present embodiment improves the brightness of the LCD by increasing the aperture ratio, whereby the optical thin film for improving brightness can be properly reduced and so the manufacturing cost of the LCD can be lowered.

In the present embodiment, before forming the color resin, a passivation layer (not shown) may be deposited on the thin film transistor, and the color resin is formed on the passivation layer. In order to form through-hole in the passivation layer, the passivation layer through-hole may be formed either separately after the passivation layer is deposited or at the same time when the color resin through-hole is formed.

In the present embodiment, a common electrode having at least one slit may be formed when forming the common electrode. Thus, the LCD manufactured by said manufacturing method of LCD is an In-Plane Switching (IPS) type LCD.

Figure 8A:
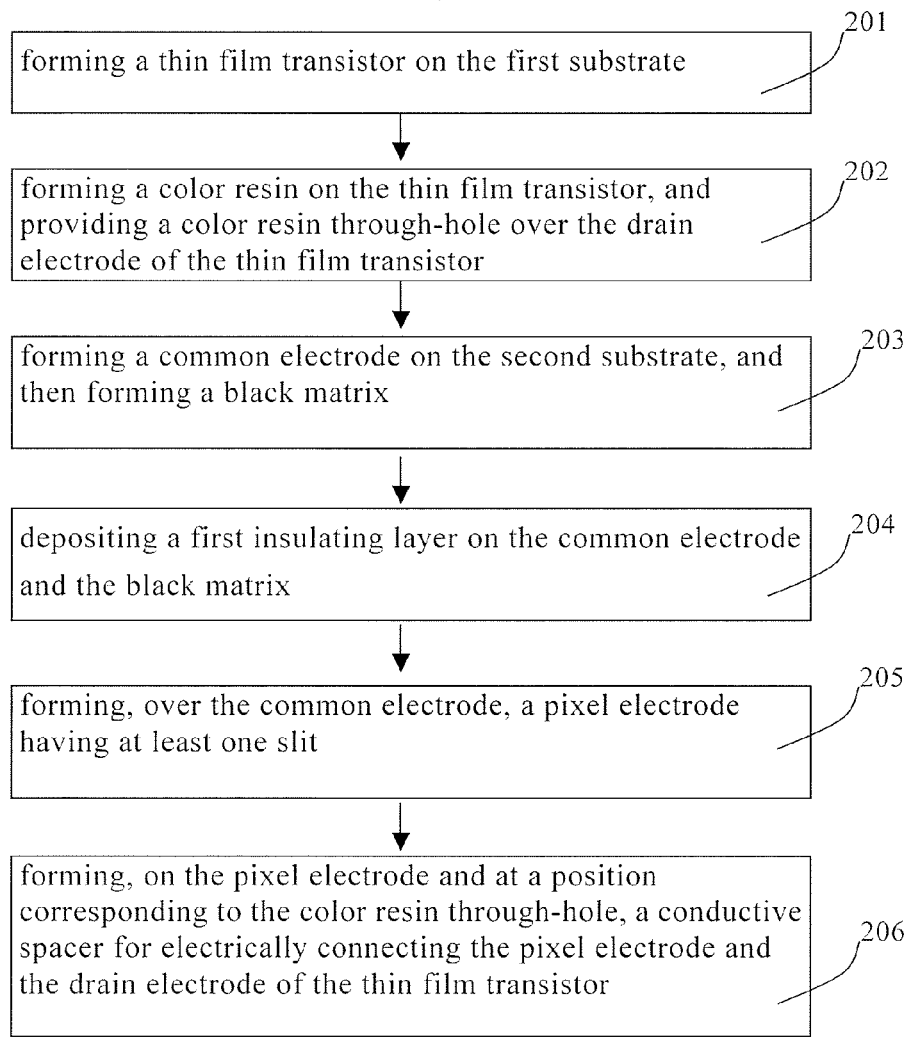
FIG. 8a is a flow chart showing the third embodiment of the manufacturing method of a LCD of the present invention.
Figure 8B:
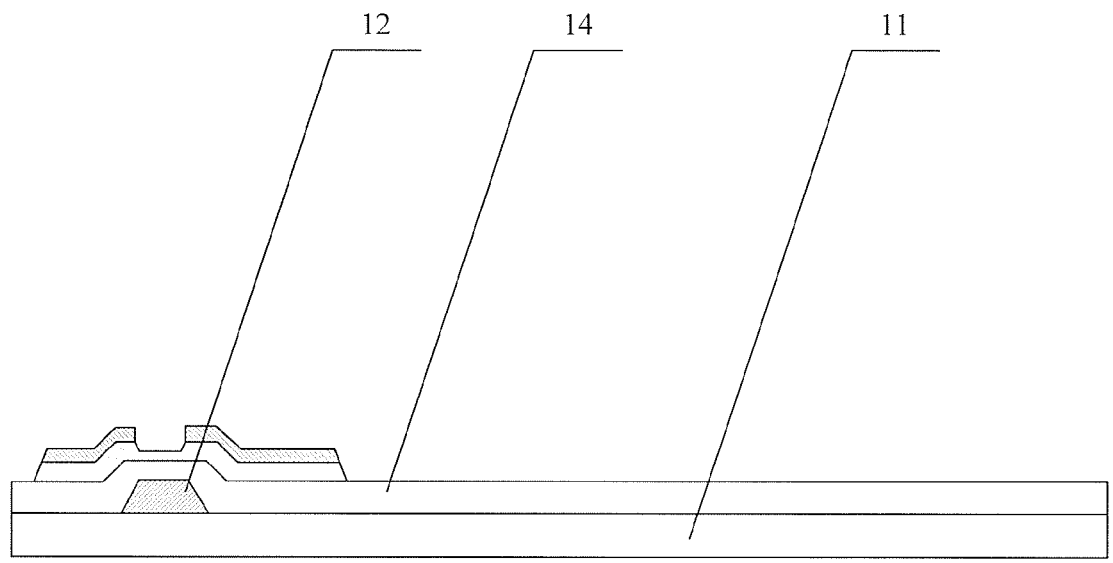
FIG. 8b is a schematic view showing the formation of a thin film transistor in the third embodiment of the manufacturing method of a LCD of the present invention.
Figure 8C:
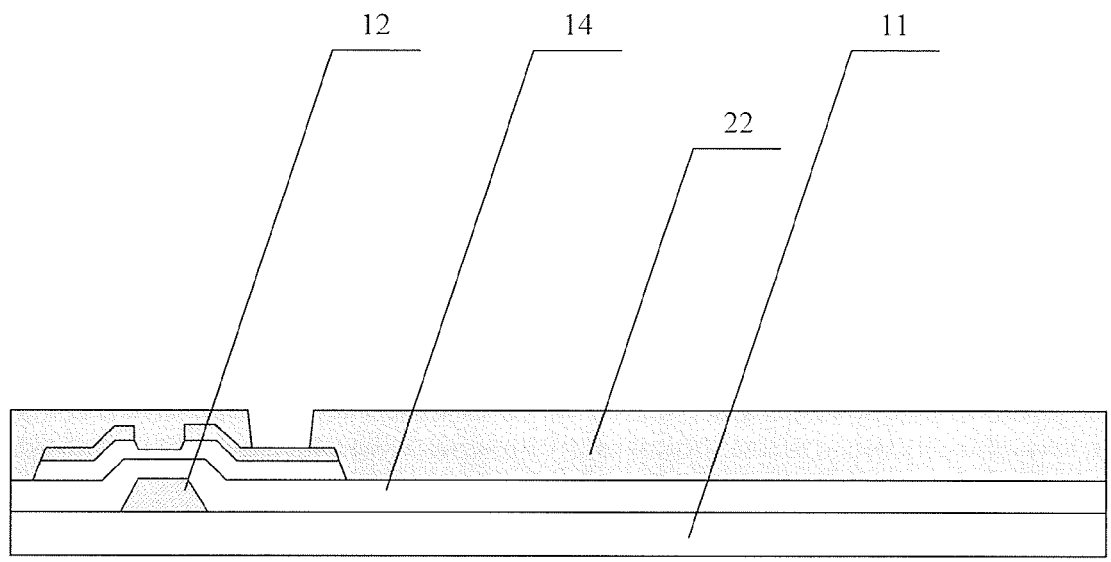
FIG. 8c is a schematic view showing the formation of a color resin in the third embodiment of the manufacturing method of a LCD of the present invention.
Figure 8D:
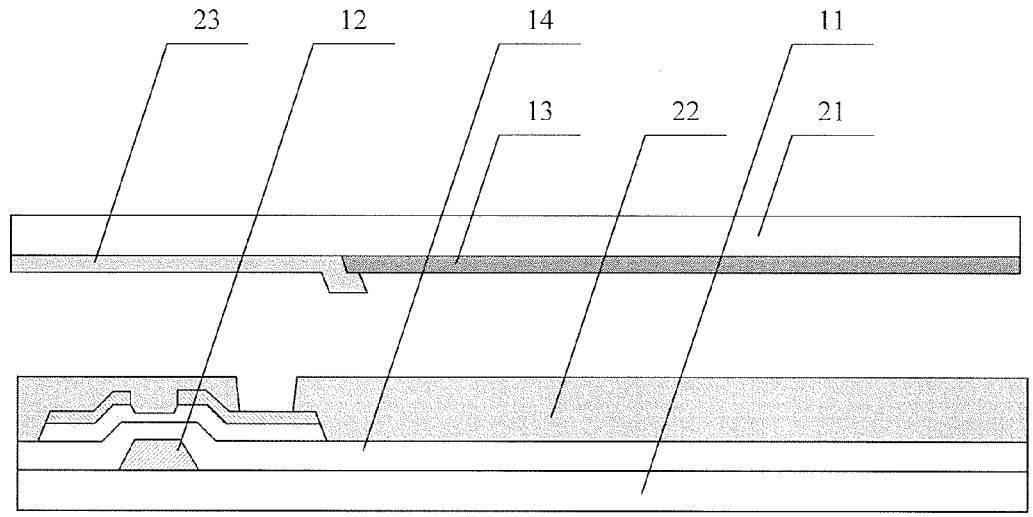
FIG. 8d is a schematic view showing the formation of a black matrix and a common electrode in the third embodiment of the manufacturing method of a LCD of the present invention.
Figure 8E:
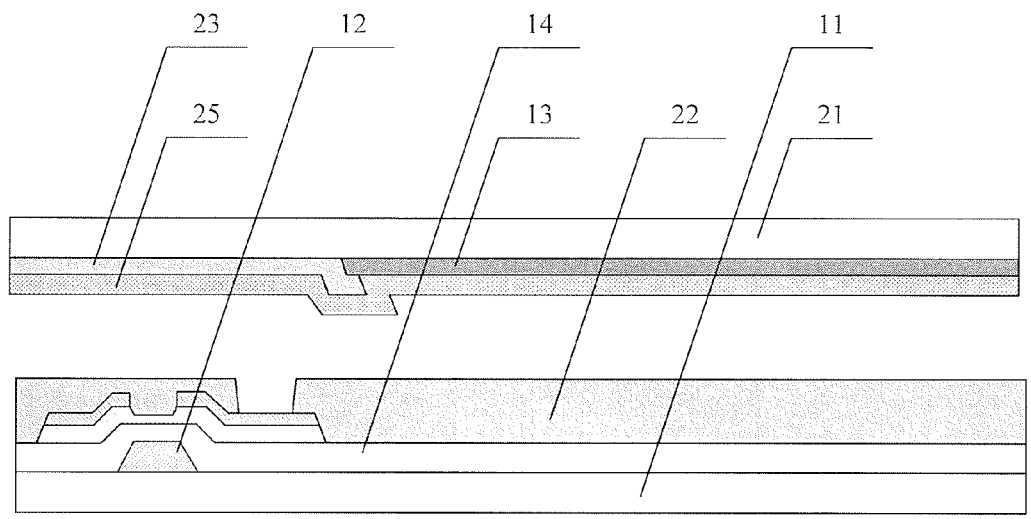
FIG. 8e is a schematic view showing the deposition of a first insulating layer in the third embodiment of the manufacturing method of a LCD of the present invention.
Figure 8F:
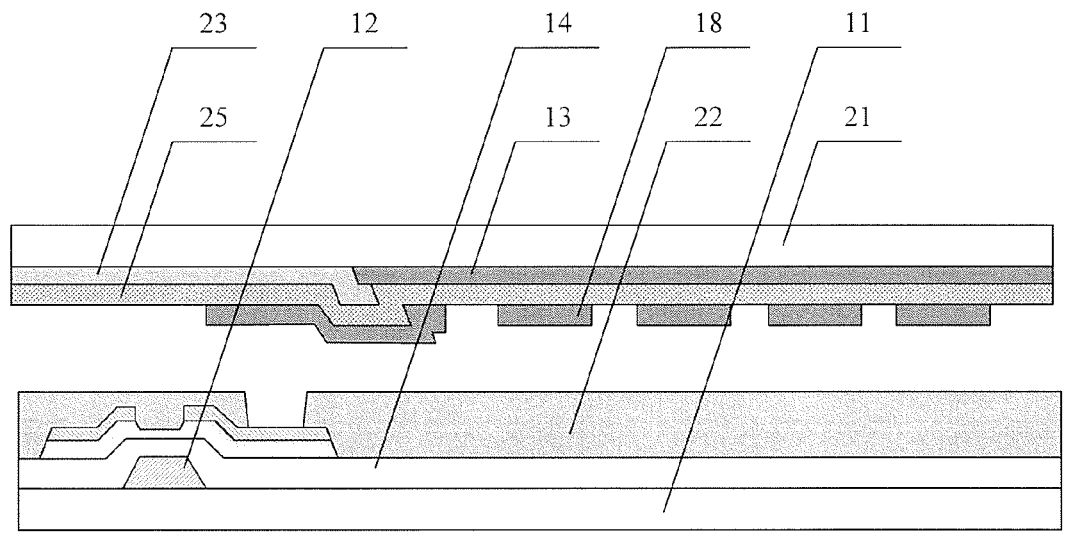
FIG. 8f is a schematic view showing the formation of a pixel electrode in the third embodiment of the manufacturing method of a LCD of the present invention.
Figure 8G:
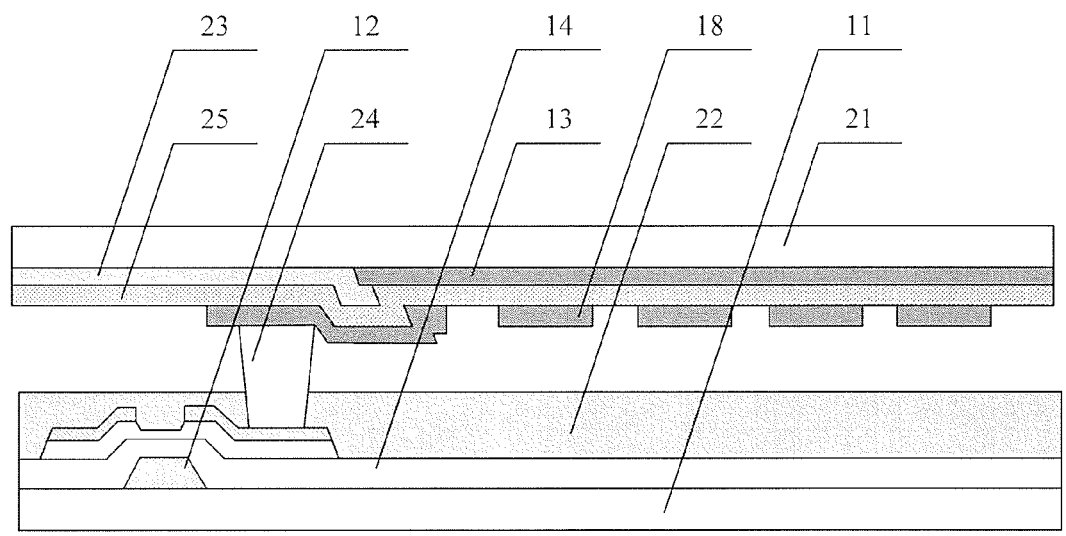
FIG. 8g is a schematic view showing the formation of a conductive spacer in the third embodiment of the manufacturing method of a LCD of the present invention.

7. Third Embodiment of the Manufacturing Method of a LCD of the Present Invention FIG. 8a is a flow chart showing the third embodiment of the manufacturing method of a LCD of the present invention; FIG. 8b is a schematic view showing the formation of a thin film transistor in the third embodiment of the manufacturing method of a LCD of the present invention; FIG. 8c is a schematic view showing, the formation of a color resin in the third embodiment of the manufacturing method of a LCD of the present invention; FIG. 8d is a schematic view showing the formation of a black matrix and a common electrode in the third embodiment of the manufacturing method of a LCD of the present invention; FIG. 8e is a schematic view showing the deposition of a first insulating layer in the third embodiment of the manufacturing method of a LCD of the present invention; FIG. 8f is a schematic view showing the formation of a pixel electrode in the third embodiment of the manufacturing method of a LCD of the present invention; FIG. 8g is a schematic view showing the formation of a conductive spacer in the third embodiment of the manufacturing method of a LCD of the present invention.

As shown in FIGS. 8a~8g, the manufacturing method of a LCD of the present embodiment comprises the following steps.

Step 201: forming a thin film transistor on the first substrate 11. The method of forming the thin film transistor may use known or future developed technologies, and so detailed description is omitted here. The thin film transistor comprises a gate electrode 12, a gate insulating layer 14, a semiconductor layer 15, a drain electrode 19, and a source electrode connected to or integrally formed with the data line 16, and the gate electrode 12 is connected to or integrally formed with the corresponding gate line, as shown in FIG. 8b.

Step 202: forming a color resin 22 on the thin film transistor, and providing a color resin through-hole 32 over the drain electrode 19 of the thin film transistor, as shown in FIG. 8c.

Step 203: firstly forming a common electrode 13 on the second substrate 21, and then forming a black matrix 23. The edge of the common electrode 13 and the edge of the black matrix 23 overlap each other, and the edge of the black matrix 23 is on the edge of the common electrode 13, as shown in FIG. 8d.

Step 204: depositing a first insulating layer 25 on the common electrode 13 and the black matrix 23 such that the first insulating layer 25 covers the whole surface of the substrate 21, as shown in FIG. 8e.

Step 205: forming, over the common electrode 13, a pixel electrode 18 having at least one slit, as shown in FIG. 8f.

Step 206: forming, on the pixel electrode 18 and at a position corresponding to the color resin through-hole 32, a conductive spacer 24 for electrically connecting the pixel electrode and the drain electrode 19 of the thin film transistor, as shown in FIG. 8g.

Then, the prepared first substrate 11 and second substrate 21 are assembled together, and a liquid crystal layer (not shown) is provided in a liquid crystal cell formed by the first substrate 11 and the second substrate 21. After the assembling, the conductive spacer 24 electrically connects the pixel electrode 18 and the corresponding drain electrode 19 of the thin film transistor.

In this embodiment, Step 201 and Step 202 belong to the manufacturing process of the first substrate; Step 203 to Step 206 belong to the manufacturing process of the second substrate.

In the manufacturing method of a LCD of the present embodiment, the thin film transistor array is formed on the first substrate, the common electrode and the pixel electrode are formed on the second substrate, and the conductive spacer electrically connects the thin film transistor on the first substrate to the pixel electrode on the second substrate. Thus, the distance between the data line and the pixel electrode is increased, thus effectively increasing the straight line distance between the data line and the pixel electrode. In addition, the horizontal electric field formed between the common electrode and the pixel electrode is not affected, thereby overcoming the defect of the prior art that the technique for improving aperture ratio can not be applied to the horizontal electric field type LCD. Furthermore, the LCD of the present embodiment improves the brightness of the LCD by increasing the aperture ratio, whereby the optical thin film for improving brightness can be properly reduced and so the manufacturing cost of the LCD can be lowered.

In the present embodiment, before forming the color resin, a passivation layer (not shown) may be deposited on the thin film transistor, and the color resin is formed on the passivation layer. In order to form through-hole in the passivation layer, the passivation layer through-hole may be formed either separately after the passivation layer is deposited or at the same time when the color resin through-hole is formed.

In the present embodiment, a common electrode having at least one slit may be formed when forming the common electrode. Thus, the LCD manufactured by said manufacturing method of LCD is an In-Plane Switching (IPS) type LCD.

Figure 9A:
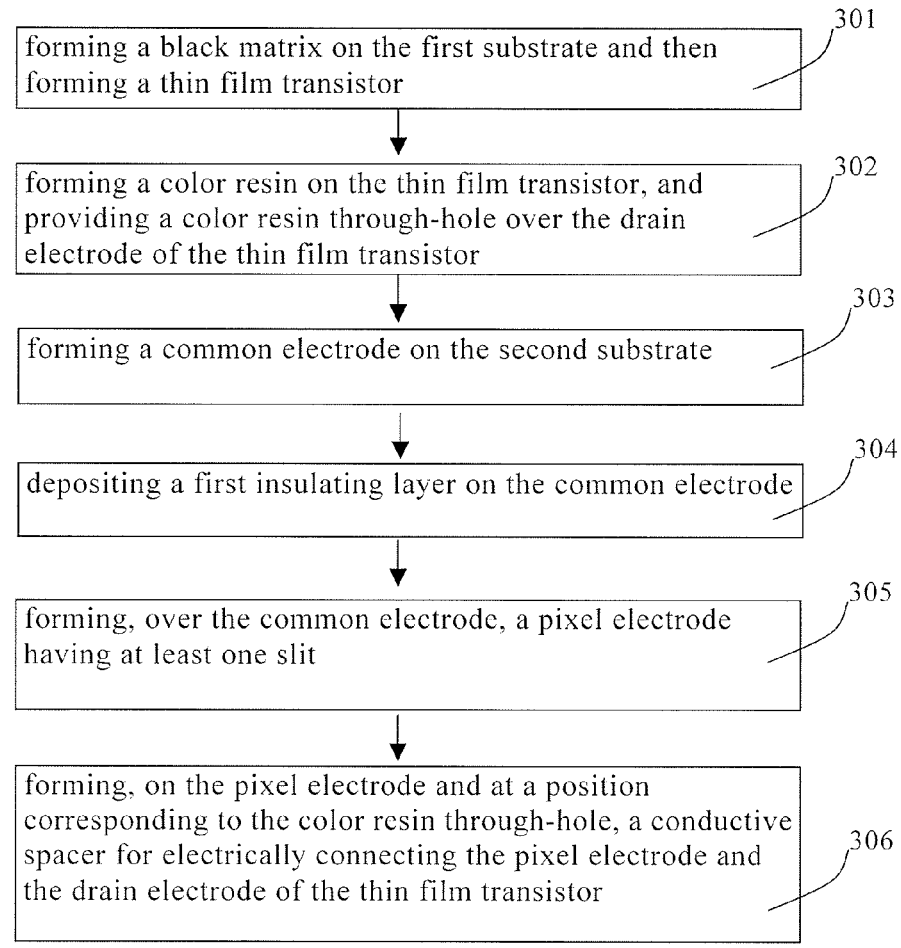
FIG. 9a is a flow chart showing the fourth embodiment of the manufacturing method of a LCD of the present invention.
Figure 9B:
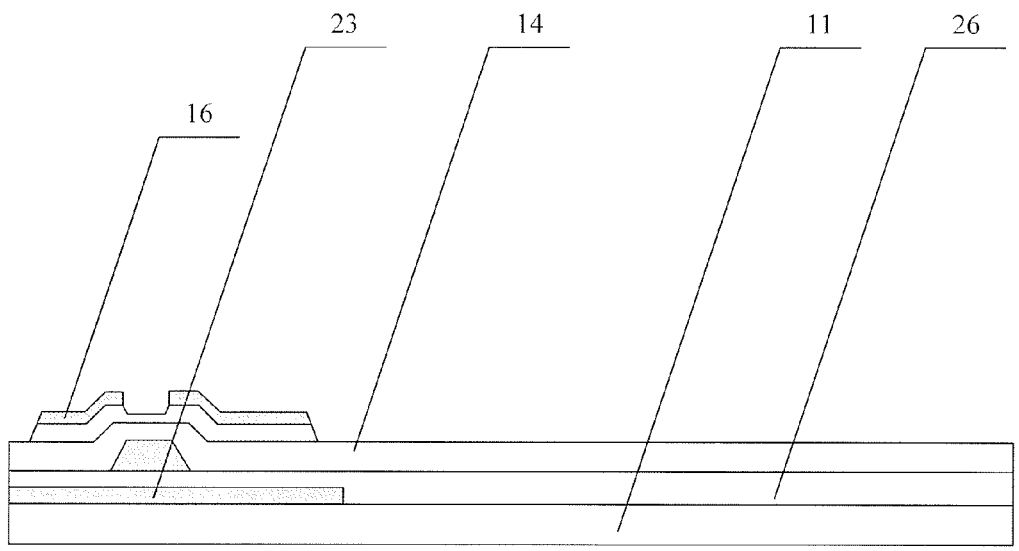
FIG. 9b is a schematic view showing the formation of a thin film transistor in the fourth embodiment of the manufacturing method of a LCD of the present invention.
Figure 9C:
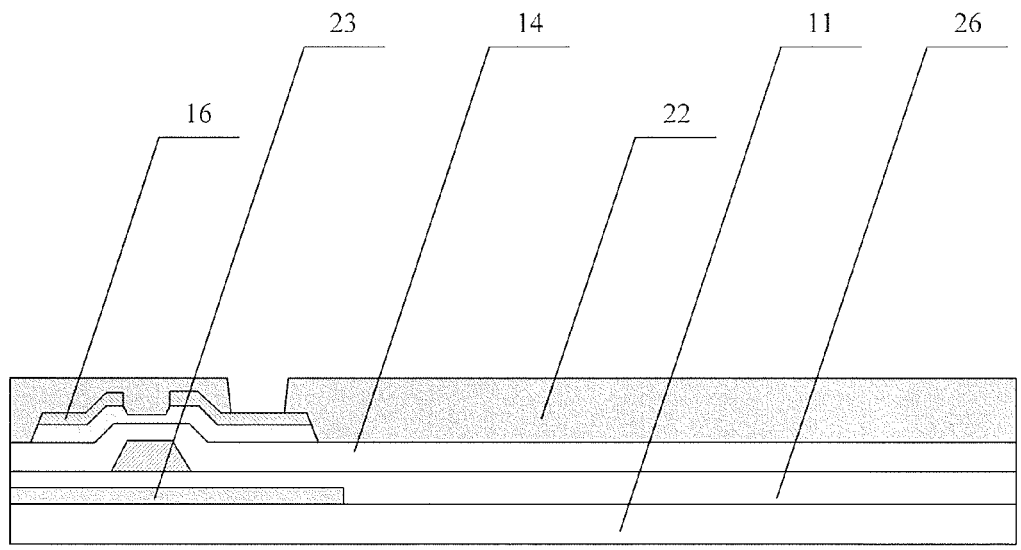
FIG. 9c is a schematic view showing the formation of a color resin in the fourth embodiment of the manufacturing method of a LCD of the present invention.
Figure 9D:
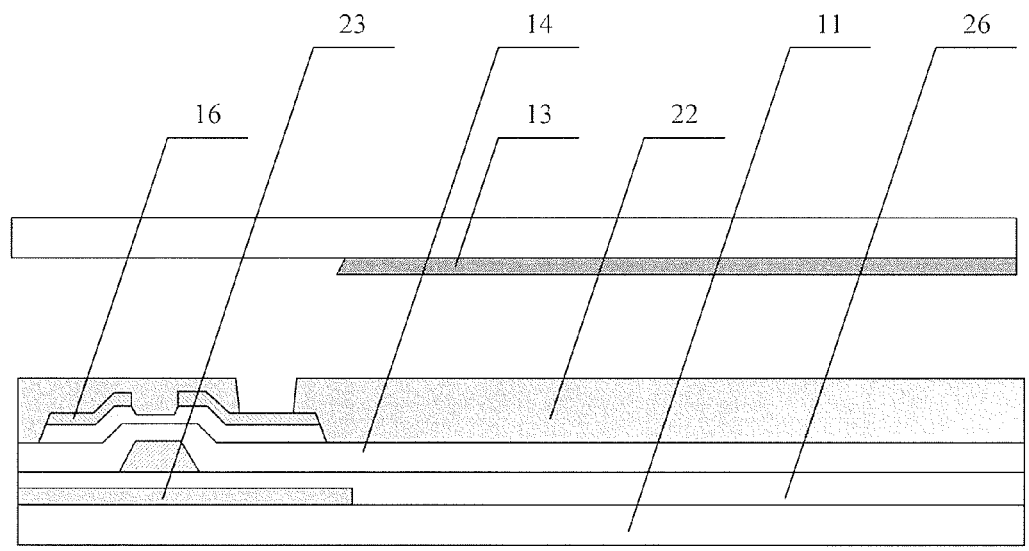
FIG. 9d is a schematic view showing the formation of a black matrix and a common electrode in the fourth embodiment of the manufacturing method of a LCD of the present invention.
Figure 9E:
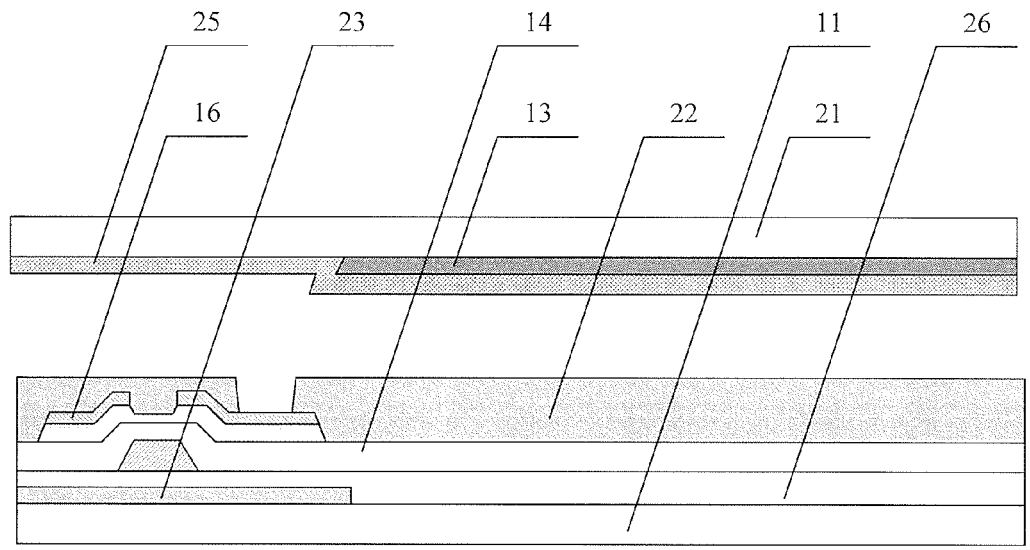
FIG. 9e is a schematic view showing the deposition of a first insulating layer in the fourth embodiment of the manufacturing method of a LCD of the present invention.
Figure 9F:
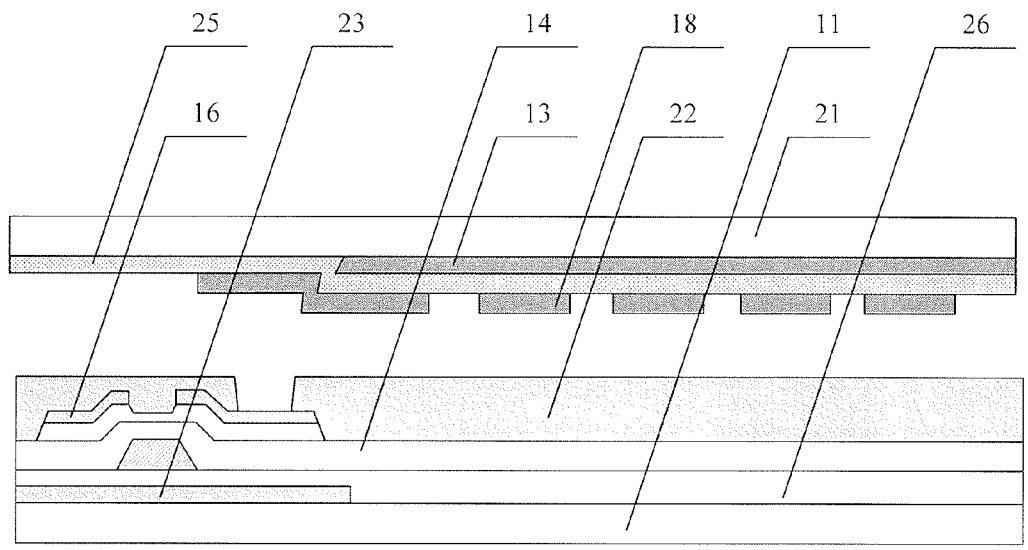
FIG. 9f is a schematic view showing the formation of a pixel electrode in the fourth embodiment of the manufacturing method of a LCD of the present invention.
Figure 9G:
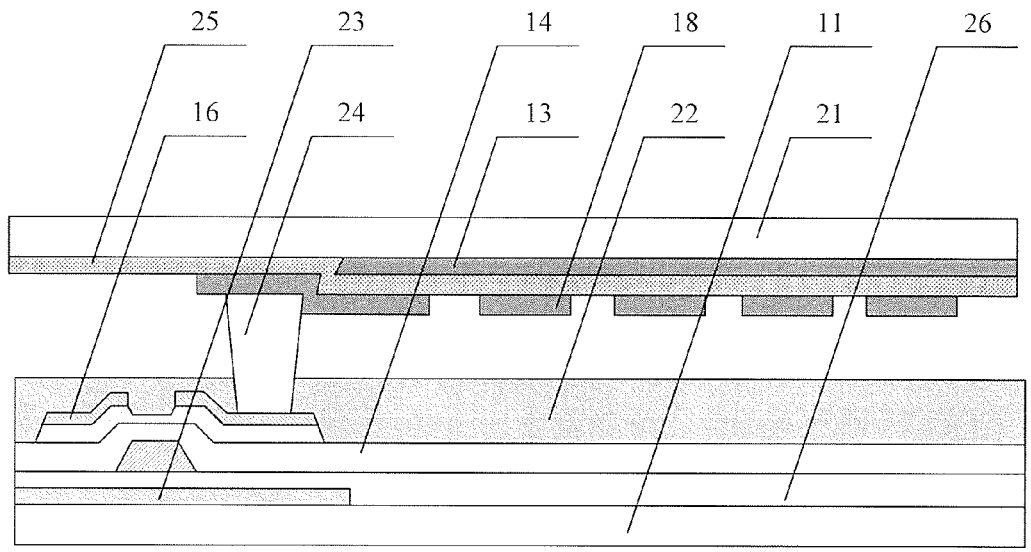
FIG. 9g is a schematic view showing the formation of a conductive spacer in the fourth embodiment of the manufacturing method of a LCD of the present invention.

8. Fourth Embodiment of the Manufacturing Method of a LCD of the Present Invention FIG. 9a is a flow chart showing the fourth embodiment of the manufacturing method of a LCD of the present invention; FIG. 9b is a schematic view showing the formation of a thin film transistor in the fourth embodiment of the manufacturing method of a LCD of the present invention; FIG. 9c is a schematic view showing the formation of a color resin in the fourth embodiment of the manufacturing method of a LCD of the present invention; FIG. 9d is a schematic view showing the formation of a black matrix and a common electrode in the fourth embodiment of the manufacturing method of a LCD of the present invention; FIG. 9e is a schematic view showing the deposition of a first insulating layer in the fourth embodiment of the manufacturing method of a LCD of the present invention; FIG. 9f is a schematic view showing the formation of a pixel electrode in the fourth embodiment of the manufacturing method of a LCD of the present invention; FIG. 9g is a schematic view showing the formation of a conductive spacer in the fourth embodiment of the manufacturing method of a LCD of the present invention.

As shown in FIGS. 9a~9g, the manufacturing method of a LCD of the present embodiment comprises the following steps.

Step 301: firstly forming a black matrix 23 on the first substrate 11 and then forming a thin film transistor. That is, the step comprises forming the thin film transistor on the black matrix 23 after forming the black matrix 23 on the first substrate 11. The method of forming the thin film transistor may use known or future developed technologies, and so detailed description is omitted here. The thin film transistor comprises a gate electrode 12, a gate insulating layer 14, a semiconductor layer 15, a drain electrode 19, and a source electrode connected to or integrally formed with the data line 16, and the gate electrode 12 is connected to or integrally formed with the corresponding gate line, as shown in FIG. 9b.

Step 302: forming a color resin 22 on the thin film transistor, and providing a color resin through-hole 32 over the drain electrode 19 of the thin film transistor, as shown in FIG. 9c.

Step 303: forming a common electrode 13 on the second substrate 21, as shown in FIG. 9d.

Step 304: depositing a first insulating layer 25 on the common electrode 13 and the black matrix 23 such that the first insulating layer 25 covers the whole surface of the substrate 21, as shown in FIG. 9e.

Step 305: forming, over the common electrode 13, a pixel electrode 18 having at least one slit, as shown in FIG. 9f.

Step 306: forming, on the pixel electrode 18 and at a position corresponding to the color resin through-hole 32, a conductive spacer 24 for electrically connecting the pixel electrode and the drain electrode 19 of the thin film transistor, as shown in FIG. 9g.

Then, the prepared first substrate 11 and second substrate 21 are assembled together, and a liquid crystal layer (not shown) is provided in a liquid crystal cell formed by the first substrate 11 and the second substrate 21. After the assembling, the conductive spacer 24 electrically connects the pixel electrode 18 and the corresponding drain electrode 19 of the thin film transistor.

In this embodiment, Step 301 and Step 302 belong to the manufacturing process of the first substrate; Step 303 to Step 306 belong to the manufacturing process of the second substrate.

In the manufacturing method of a LCD of the present embodiment, the black matrix and the thin film transistor array are sequentially formed on the first substrate, the common electrode and the pixel electrode are formed on the second substrate, and the conductive spacer electrically connects the thin film transistor on the first substrate to the pixel electrode on the second substrate. Thus, in the case that the black matrix, the color resin and the thin film transistor array are formed on the first substrate, liquid crystal is out of the horizontal electric field, thereby overcoming the defect of the prior art that the technique for improving aperture ratio can not be applied to the horizontal electric field type LCD. Furthermore, the LCD of the present embodiment improves the brightness of the LCD by increasing the aperture ratio, whereby the optical thin film for improving brightness can be properly reduced and so the manufacturing cost of the LCD can be lowered.

In the present embodiment, after the black matrix 23 is formed, a second insulating layer may be formed on the black matrix 23.

In the present embodiment, before forming the color resin 22, a passivation layer (not shown) may be deposited on the thin film transistor, and the color resin 22 is formed on the passivation layer. In order to form through-hole in the passivation layer, the passivation layer through-hole may be formed either separately after the passivation layer is deposited or at the same time when the color resin through-hole is formed.

In the present embodiment, a common electrode 13 having at least one slit may be formed when forming the common electrode 13. Thus, the LCD manufactured by said manufacturing method of LCD is an In-Plane Switching (IPS) type LCD.

Figure 10A:
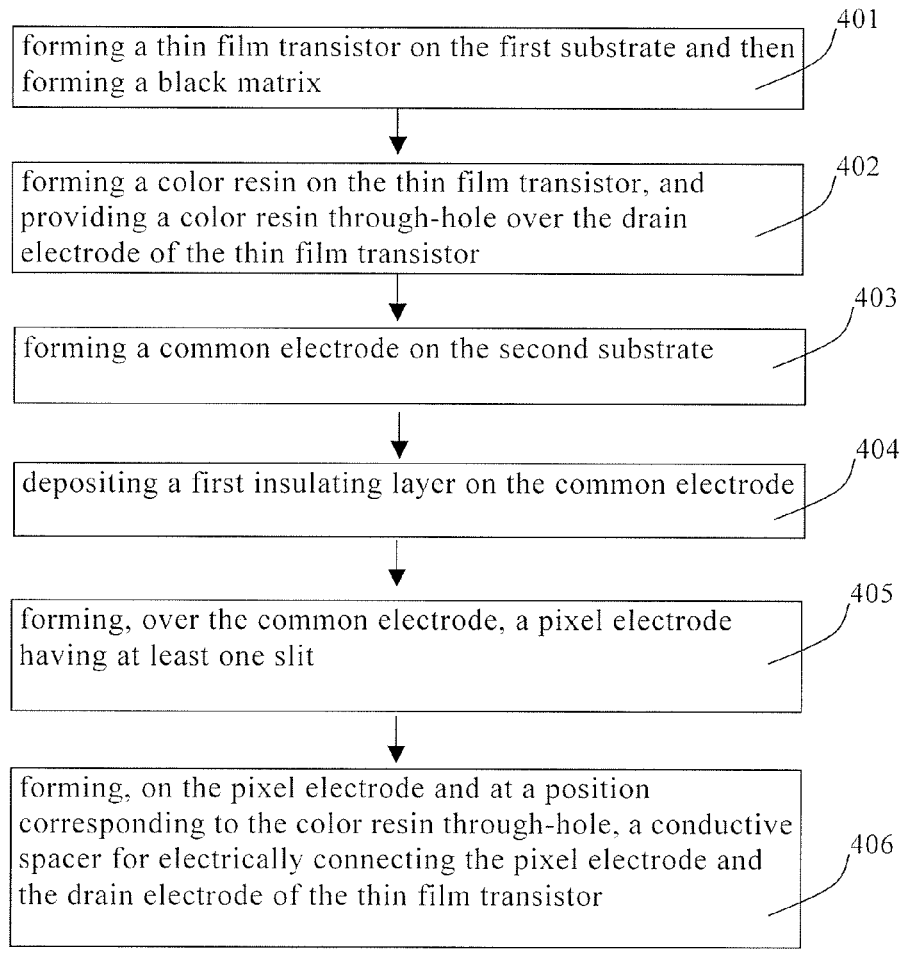
FIG. 10a is a flow chart showing the fifth embodiment of the manufacturing method of a LCD of the present invention.
Figure 10B:
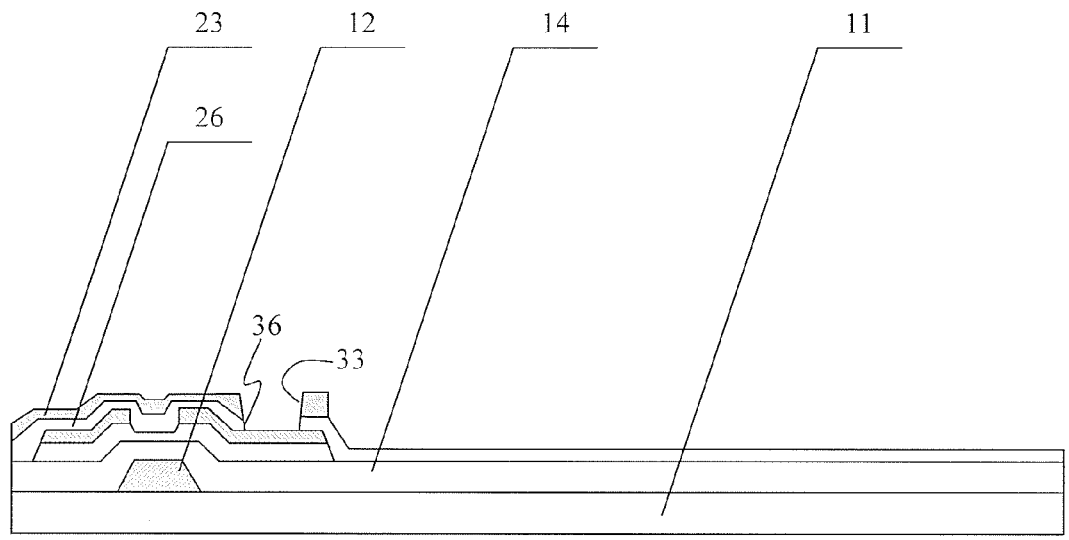
FIG. 10b is a schematic view showing the formation of a thin film transistor in the fifth embodiment of the manufacturing method of a LCD of the present invention.
Figure 10C:
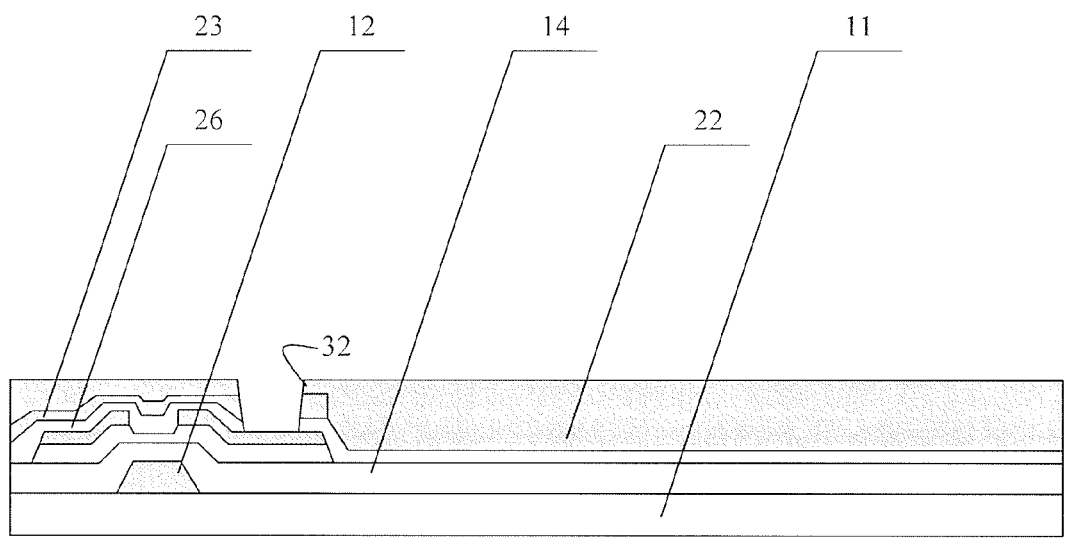
FIG. 10c is a schematic view showing the formation of a color resin in the fifth embodiment of the manufacturing method of a LCD of the present invention.
Figure 10D:
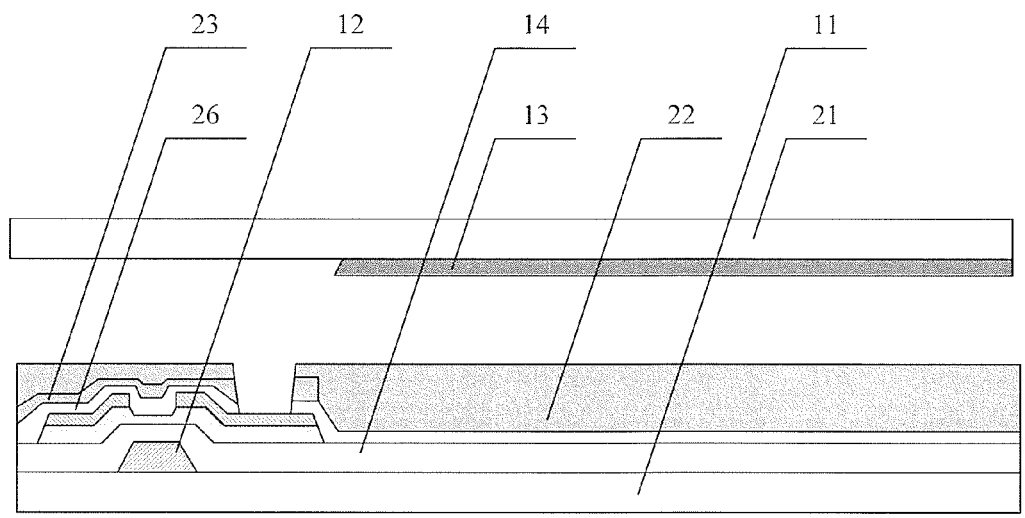
FIG. 10d is a schematic view showing the formation of a black matrix and a common electrode in the fifth embodiment of the manufacturing method of a LCD of the present invention.
Figure 10E:
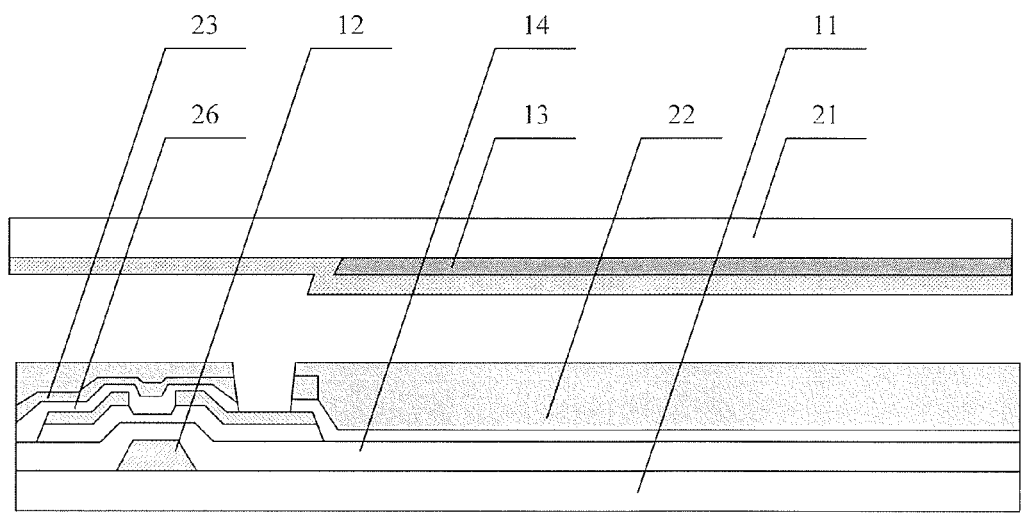
FIG. 10e is a schematic view showing the deposition of a first insulating layer in the fifth embodiment of the manufacturing method of a LCD of the present invention.
Figure 10F:
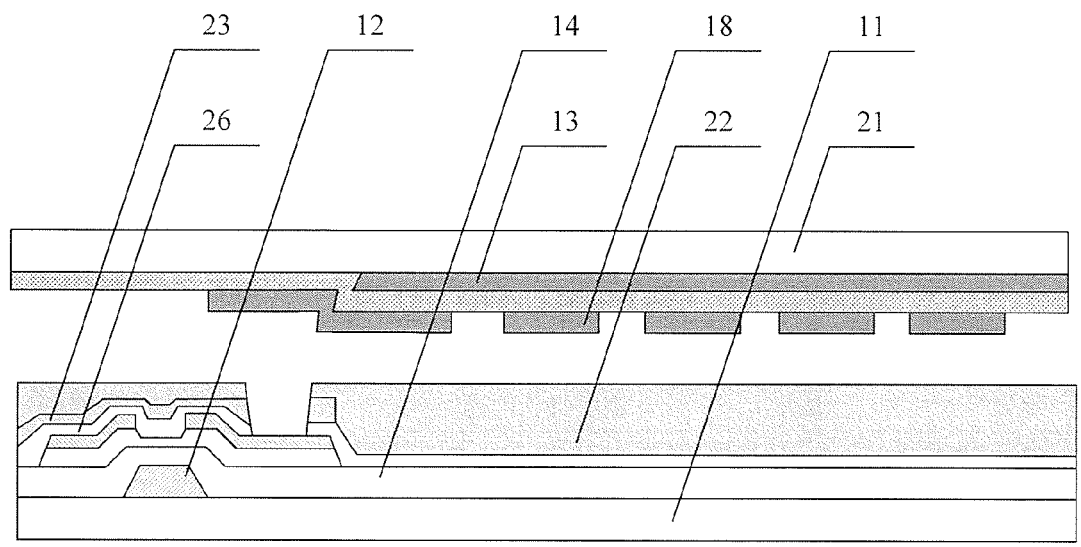
FIG. 10f is a schematic view showing the formation of a pixel electrode in the fifth embodiment of the manufacturing method of a LCD of the present invention.
Figure 10G:
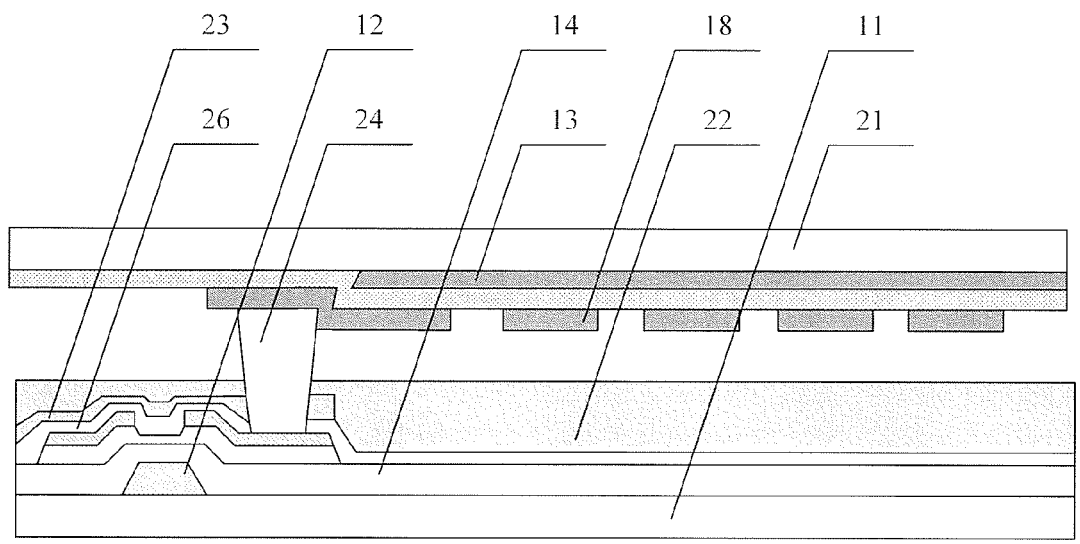
FIG. 10g is a schematic view showing the formation of a conductive spacer in the fifth embodiment of the manufacturing method of a LCD of the present invention.

9. Fifth Embodiment of the Manufacturing Method of a LCD of the Present Invention FIG. 10a is a flow chart showing the fifth embodiment of the manufacturing method of a LCD of the present invention; FIG. 10b is a schematic view showing the formation of a thin film transistor in the fifth embodiment of the manufacturing method of a LCD of the present invention; FIG. 10c is a schematic view showing the formation of a color resin in the fifth embodiment of the manufacturing method of a LCD of the present invention; FIG. 10d is a schematic view showing the formation of a black matrix and a common electrode in the fifth embodiment of the manufacturing method of a LCD of the present invention; FIG. 10e is a schematic view showing the deposition of a first insulating layer in the fifth embodiment of the manufacturing method of a LCD of the present invention; FIG. 10f is a schematic view showing the formation of a pixel electrode in the fifth embodiment of the manufacturing method of a LCD of the present invention; FIG. 10g is a schematic view showing the formation of a conductive spacer in the fifth embodiment of the manufacturing method of a LCD of the present invention.

As shown in FIGS. 10a~10g, the manufacturing method of a LCD of the present embodiment comprises the following steps.

Step 401: firstly forming a thin film transistor on the first substrate 11 and then forming a black matrix 23. That is, the step comprises forming the black matrix 23 on the thin film transistor after forming the thin film transistor on the first substrate 11. The method of forming the thin film transistor may use known or future developed technologies, and so detailed description is omitted here. The thin film transistor comprises a gate electrode 12, a gate insulating layer 14, a semiconductor layer 15, a drain electrode 19, and a source electrode connected to or integrally formed with the data line 16, and the gate electrode 12 is connected to or integrally formed with the corresponding gate line, as shown in FIG. 10b.

Step 402: forming a color resin 22 on the thin film transistor, and providing a color resin through-hole 32 over the drain electrode 19 of the thin film transistor, as shown in FIG. 10c.

Step 403: forming a common electrode 13 on the second substrate 21, as shown in FIG. 10d.

Step 404: depositing a first insulating layer 25 on the common electrode 13 and the black matrix 23 such that the first insulating layer 25 covers the whole surface of the substrate 21, as shown in FIG. 10e.

Step 405: forming, over the common electrode 13, a pixel electrode 18 having at least one slit, as shown in FIG. 10f.

Step 406: forming, on the pixel electrode 18 and at a position corresponding to the color resin through-hole 32, a conductive spacer 24 for electrically connecting the pixel electrode and the drain electrode 19 of the thin film transistor, as shown in FIG. 10g.

Then, the prepared first substrate 11 and second substrate 21 are assembled together, and a liquid crystal layer (not shown) is provided in a liquid crystal cell formed by the first substrate 11 and the second substrate 21. After the assembling, the conductive spacer 24 electrically connects the pixel electrode 18 and the corresponding drain electrode 19 of the thin film transistor.

In this embodiment, Step 401 and Step 402 belong to the manufacturing process of the first substrate; Step 403 to Step 406 belong to the manufacturing process of the second substrate.

In the manufacturing method of a LCD of the present embodiment, the thin film transistor array and the black matrix are sequentially formed on the first substrate, the common electrode and the pixel electrode are formed on the second substrate, and the conductive spacer electrically connects the thin film transistor on the first substrate to the pixel electrode on the second substrate. Thus, in the case that the black matrix, the color resin and the thin film transistor array are formed on the first substrate, liquid crystal is out of the horizontal electric field, thereby overcoming the defect of the prior art that the technique for improving aperture ratio can not be applied to the horizontal electric field type LCD. Furthermore, the LCD of the present embodiment improves the brightness of the LCD by increasing the aperture ratio, whereby the optical thin film for improving brightness can be properly reduced and so the manufacturing cost of the LCD can be lowered.

In the present embodiment, before the black matrix 23 is formed, a second insulating layer 26 may be formed on the thin film transistor. The black matrix 23 is formed on the second insulating layer 26, and a second insulating layer through-hole 36 and a black matrix through-hole 33 are formed respectively on the second insulating layer 26 and the black matrix 23 at the positions corresponding to the drain electrode 19 of the thin film transistor.

In the present embodiment, a common electrode having at least one slit may be formed when forming the common electrode. Thus, the LCD manufactured by the manufacturing method of LCD is an In-Plane Switching (IPS) type LCD.

The embodiment of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A horizontal electric field type liquid crystal display (LCD) comprising:
a first substrate, a second substrate, a liquid crystal layer sandwiched between the first substrate and the second substrate, and a spacer disposed between the first and the second substrates, wherein the first substrate and the second substrate comprise: a thin film transistor, a gate line and a data line for driving the thin film transistor, a pixel electrode, and a common electrode corresponding to and forming a horizontal electric field with the pixel electrode;

wherein the thin film transistor, the gate line and the data line are only located on the first substrate, and the pixel electrode and the common electrode are only located on the second substrate, and the spacer is a conductive spacer electrically connecting each pixel electrode on the second substrate to the corresponding thin film transistor on the first substrate, and the spacer is located in a region corresponding to a drain electrode of the thin film transistor.

2. The horizontal electric field type LCD according to claim 1, wherein one end of each conductive spacer is disposed on the corresponding pixel electrode, and the other end is disposed on the corresponding thin film transistor, such that the pixel electrode and the thin film transistor are electrically connected.

3. The horizontal electric field type LCD according to claim 1, further comprising a color resin positioned on the first substrate or on the second substrate.

4. The horizontal electric field type LCD according to claim 1, further comprising a black matrix positioned on the first substrate or on the second substrate.

5. The horizontal electric field type LCD according to claim 1, wherein the pixel electrode is provided with a plurality of slits capable of forming the horizontal electric field with the common electrode.

6. The horizontal electric field type LCD according to claim 5, wherein the common electrode is provided with at least one slit used for forming the horizontal electric field with the pixel electrode.

7. The horizontal electric field type LCD according to claim 2, further comprising a color resin positioned on the first substrate or on the second substrate.

8. The horizontal electric field type LCD according to claim 2, further comprising a black matrix positioned on the first substrate or on the second substrate.

9. The horizontal electric field type LCD according to claim 2, wherein the pixel electrode is provided with a plurality of slits capable of forming the horizontal electric field with the common electrode.

10. The horizontal electric field type LCD according to claim 9, wherein the common electrode is provided with at least one slit used for forming the horizontal electric field with the pixel electrode.

11. A method of manufacturing a horizontal electric field type liquid crystal display (LCD) comprising:

Step 1: providing a first substrate with a thin film transistor and a gate line and a data line for driving the thin film transistor;

Step 2: providing a second substrate with a pixel electrode and a common electrode corresponding to and forming a horizontal electric field with the pixel electrode;

Step 3: forming a conductive spacer for electrically connecting each pixel electrode on the second substrate to the corresponding thin film transistor on the first substrate; and Step 4: assembling the first substrate and the second substrate together, providing a liquid crystal layer between the first substrate and the second substrate, and electrically connecting the thin film transistor to the pixel electrode via the conductive spacer, wherein the thin film transistor, the gate line and the data line are only located on the first substrate, and the pixel electrode and the common electrode are only located on the second substrate, and wherein the spacer is located in a region corresponding to a drain electrode of the thin film transistor.

12. The method of manufacturing a horizontal electric field type LCD according to claim 11, wherein in the Step 3, one end of the conductive spacer is formed on the thin film transistor of the first substrate and the other end is projected; then in the Step 4, accordingly, the other end of the conductive spacer is brought into contact with the pixel electrode of the second substrate.

13. The method of manufacturing a horizontal electric field type LCD according to claim 11, wherein in the Step 3, one end of the conductive spacer is formed on the pixel electrode of the second substrate and the other end is projected; then in the Step 4, accordingly, the other end of the conductive spacer is brought into contact with the thin film transistor of the first substrate.

14. The method of manufacturing a horizontal electric field type LCD according to claim 11, wherein a plurality of slits capable of forming the horizontal electric field with the common electrode is formed on the pixel electrode.

15. The method of manufacturing a horizontal electric field type LCD according to claim 14, wherein at least one slit is formed on the common electrode so as to form the horizontal electric field with the pixel electrode.

16. The method of manufacturing a horizontal electric field type LCD according to claim 11, wherein in the step 1, a color resin is further formed on the first substrate.

17. The method of manufacturing a horizontal electric field type LCD according to claim 11, wherein in the step 2, a color resin is further formed on the second substrate.

18. The method of manufacturing a horizontal electric field type LCD according to claim 11, wherein in the step 1, a black matrix is further formed on the first substrate.

19. The method of manufacturing a horizontal electric field type LCD according to claim 18, wherein the black matrix is formed under the thin film transistor.

20. The method of manufacturing a horizontal electric field type LCD according to claim 11, wherein in the step 2, a black matrix is further formed on the second substrate.

* * * * *